United States Patent
Young et al.

(10) Patent No.: US 11,704,768 B2
(45) Date of Patent: Jul. 18, 2023

(54) TEMPORAL SUPERSAMPLING FOR FOVEATED RENDERING SYSTEMS

(71) Applicant: Sony Interactive Entertainment Inc., Tokyo (JP)

(72) Inventors: Andrew Young, San Mateo, CA (US); Chris Ho, San Mateo, CA (US); Jeffrey Roger Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 36 days.

(21) Appl. No.: 17/398,818

(22) Filed: Aug. 10, 2021

(65) Prior Publication Data

US 2021/0366079 A1  Nov. 25, 2021

Related U.S. Application Data

(63) Continuation of application No. 16/928,527, filed on Jul. 14, 2020, now Pat. No. 11,087,437, which is a
(Continued)

(51) Int. Cl.
*G06T 3/40* (2006.01)
*G06F 3/01* (2006.01)
*G06T 11/40* (2006.01)

(52) U.S. Cl.
CPC ............... *G06T 3/40* (2013.01); *G06F 3/012* (2013.01); *G06F 3/013* (2013.01); *G06T 3/4053* (2013.01); *G06T 11/40* (2013.01)

(58) Field of Classification Search
CPC .............. G09G 5/391; G09G 5/001; G09G 2340/0428; G09G 2354/00; G09G 2360/08; G09G 2310/0232; G09G 2370/02; G09G 2360/18; G09G 2350/00; G09G 5/42; G06F 3/013; G06F 1/163; G06F 3/147; G06F 3/011; G06F 3/012; G06T 3/40; G06T 3/4053; G06T 11/40
See application file for complete search history.

(56) References Cited

U.S. PATENT DOCUMENTS

2003/0142099 A1*  7/2003  Deering .................. G09G 5/42
                                                           345/531
2014/0226003 A1*  8/2014  Phaneuf ............... H01J 37/222
                                                           348/80
(Continued)

*Primary Examiner* — Xilin Guo
(74) *Attorney, Agent, or Firm* — Penilla IP, APC

(57) ABSTRACT

Methods and systems are provided for using temporal supersampling to increase a displayed resolution associated with peripheral region of a foveated rendering view. A method for enabling reconstitution of higher resolution pixels from a low resolution sampling region for fragment data is provided. The method includes an operation for receiving a fragment from a rasterizer of a GPU and for applying temporal supersampling to the fragment with the low resolution sampling region over a plurality of prior frames to obtain a plurality of color values. The method further includes an operation for reconstituting a plurality of high resolution pixels in a buffer that is based on the plurality of color values obtained via the temporal supersampling. Moreover, the method includes an operation for sending the plurality of high resolution pixels for display.

20 Claims, 17 Drawing Sheets

Related U.S. Application Data continuation of application No. 15/905,801, filed on Feb. 26, 2018, now Pat. No. 10,713,752.

(60) Provisional application No. 62/517,835, filed on Jun. 9, 2017.

(56) References Cited

U.S. PATENT DOCUMENTS

| | | | |
|---|---|---|---|
| 2016/0027159 A1* | 1/2016 | Amirghodsi | G06T 5/30 |
| | | | 382/195 |
| 2017/0132833 A1* | 5/2017 | Sathe | G06T 15/04 |
| 2017/0263046 A1* | 9/2017 | Patney | G06T 15/20 |
| 2018/0176535 A1* | 6/2018 | Ninan | H04N 21/234345 |
| 2019/0384962 A1* | 12/2019 | Hayut | G06V 20/698 |

* cited by examiner

Distance away from foveal region or point of gaze
(arbitrary units)

TEMPORAL SUPERSAMPLING FOR FOVEATED RENDERING SYSTEMS

CLAIM OF PRIORITY

This application is a continuation of and claims priority to and the benefit of U.S. patent application Ser. No. 16/928,527 filed Jul. 14, 2020, and entitled "TEMPORAL SUPERSAMPLING OF FOVEATED RENDERING SYSTEMS"; which is a continuation of and claims priority to and the benefit of U.S. patent application Ser. No. 15/905,801 filed Feb. 26, 2018, and entitled "TEMPORAL SUPERSAMPLING OF FOVEATED RENDERING SYSTEMS"; which claims priority to and the benefit of U.S. Provisional Application Ser. No. 62/517,835 filed Jun. 9, 2017, and entitled "TEMPORAL SUPERSAMPLING OF FOVEATED RENDERING SYSTEMS," all of which are herein incorporated by reference in their entireties.

FIELD OF THE DISCLOSURE

The present disclosure relates generally to foveated rendering views for virtual reality (VR) content provided through head mounted displays (HMD), and more particularly to methods and systems for utilizing temporal supersampling to generate higher resolution pixels in certain regions within the foveated rendering view.

BACKGROUND

Virtual reality (VR) presented through head mounted displays (HMDs) is becoming a more and more popular way for consumers to interact with various types of content. As VR applications for generating VR content are becoming rendered with increasingly higher resolution images and with greater complexity, there is an associated increase in computational, networking, and memory cost that is needed to support these VR scenes. For example, when image resolution is increased, an associated graphics pipeline needs to perform an increasing number of operations associated with producing pixel data from geometric data generated by the VR application Likewise, there may be a proportional increase in the amount of memory needed to store geometric and pixel data needed to run the VR application. Moreover, if the VR application is executed on a computing system that communicates with the HMD over a networked connection (e.g., wired or wireless), there will moreover be increase in the amount of data that is necessary to be sent over the networked connection.

As a result, it is often the case that a bottleneck will occur when executing VR applications that are computationally and graphically demanding. Bottlenecks may result in a reduction in frame rate (frames per second), an increase in latency or lag, reduced resolution, and increased aliasing, all of which are a detriment to the overall user experience. Certain attempts to reduce the computational, memory, and network cost associated with executing VR applications have resulted in VR scenes having lower resolutions, pixilation, visual artifacts, and the like, which negatively affect the VR experience.

It is in this context that embodiments arise.

SUMMARY

Embodiments of the present disclosure provide methods and systems for enabling reconstitution of higher resolution pixels for display in undersampled regions of VR scenes by using temporal supersampling. In one embodiment, a method is provided for reconstituting higher resolution pixels from a low resolution sampling region. The method provides operations for receiving a fragment from a rasterizer. The method also includes an operation for applying temporal supersampling to the fragment with the low resolution sampling region over a plurality of prior frames for obtaining a plurality of color values. According to certain embodiments, the method may also include an operation for reconstituting a plurality of high resolution pixels in a buffer based on the plurality of color values obtained via the temporal supersampling. Moreover, the method also includes an operation for sending, from the buffer, the plurality of high resolution pixels for presentation on a display. The provided method is thus able to render higher resolution images that are sent for display without needing the large and sometimes prohibitive amounts of memory use normally associated with rendering high resolution images. As a result, the method provides one solution to a technical problem of being able to increase the image resolution associated with a VR scene while maintain lower memory use.

In another embodiment, a graphics system includes a graphics processing unit (GPU) for applying temporal supersampling to a plurality of prior frames that include a low resolution sampling region, wherein the temporal supersampling obtains a plurality of color values. The graphics system includes a frame buffer for storing the plurality of prior frames rendered by the GPU and a display buffer in which a plurality of high resolution pixels is reconstituted based on the plurality of color values obtained via the temporal supersampling of prior frames. The plurality of high resolution pixels is configured for presentation on a display.

In another embodiment, a non-transitory computer-readable storage medium storing a computer program executable by a processor-based system includes program instructions for receiving a fragment from a rasterizer, the fragment is associated with a low resolution sampling region. The embodiment further includes program instructions for applying temporal supersampling to the fragment over a plurality of prior frames for obtaining a plurality of color values. Also provided in the embodiments are program instructions for reconstituting, in a buffer, a plurality of high resolution pixels associated with the low resolution sampling region, the plurality of high resolution pixels are based on the plurality of color values obtained via the temporal supersampling. Further, the embodiment provides program instructions for sending, from the buffer, the plurality of high resolution pixels for presentation on a display.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
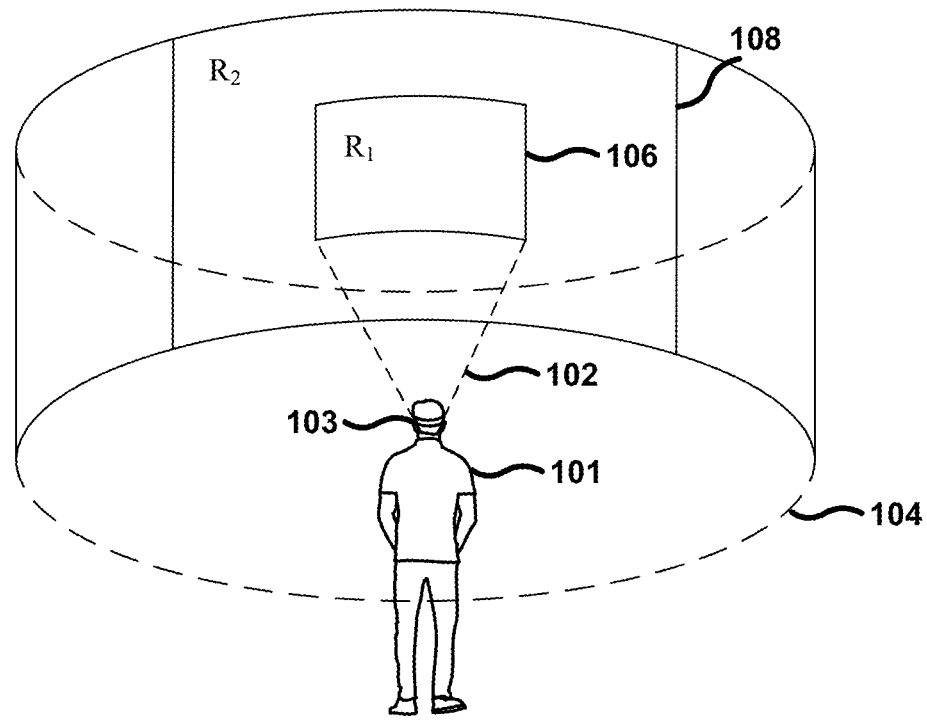
FIGS. 1A and 1B show a head mounted display (HMD) user being presented with virtual reality (VR) content having two resolutions, in accordance with various embodiment.

The following embodiments describe methods, computer programs, and apparatuses for increasing a final displayed resolution for regions within a VR scene that are associated with a lower-resolution sampling areas by temporal super-sampling the low-resolution sampling areas. It will be obvious, however, to one skilled in the art, that the present disclosure may be practiced without some or all of these specific details. In other instances, well known process operations have not been described in detail in order not to unnecessarily obscure the present disclosure.

Virtual reality (VR) environments provided by HMDs are an increasingly popular medium for consumers to interact with content and for content creators to deliver content to consumers. Moreover, as VR scenes are becoming more complex and being displayed at higher resolutions, there is an associated increase in computational, memory, and networking cost. As a result, improvements to current methods of computer graphics rendering and anti-aliasing for VR scenes displayed via HMDs would be of benefit with respect to both computational, memory, and networking resources, as well as to the VR experience for the end user.

One way of lowering the computational, memory, and networking cost (as well as associated latency) of rendering a particular VR scene described here is to display the VR scene using foveated rendering views. In accordance with one embodiment, foveated rendering may define areas within the display that are displayed at a higher resolution, quality, level of detail, sharpness, frame rate, etc. than other areas. According to these and other embodiments, areas having a higher resolution (or higher quality, level of detail, sharpness, frame rate) may be referred to as a foveal region or foveal area, and generally correlates with where a user is looking at or directed a gaze at. Additionally, areas that do not have a higher level of resolution may be referred to as peripheral regions or peripheral areas, and generally may correlate with areas where a user is not directing a gaze at. Thus, foveated rendering views and/or systems represent one such solution to a technological problem of being able to reduce computational, memory, and networking costs associated with rendering VR scenes without negatively affecting the user's experience.

For regions that are rendered at a lower resolution (e.g., a peripheral region), there is a corresponding reduction in the amount of pixel and/or fragment data that is needed to be stored in memory to render that low resolution area. For example, if a resolution for a given area within a scene is reduced by a factor of 4, then the amount of memory needed to store pixel data for each video frame for that area within the scene is reduced proportionally by about a factor of 4. According to certain embodiments, regions that are rendered at lower resolutions (e.g., peripheral regions) may also be known as undersampled regions because these regions are sampled at a lesser frequency.

As mentioned above, reducing the amount of memory used to render each video frame for a given scene would be beneficial for VR systems because, generally, the speed of memory has not kept pace with the speed of processors such as central processing units (CPUs) or graphics processing units (GPUs). Thus, by reducing a resolution associated with peripheral region(s) within a foveated rendering view by keeping memory use down and by maintaining coherent memory access would be one improvement to existing VR systems. For example, one of the improvements that flow from foveated rendering systems described here could include an improvement in a latency or lag associated with rendering interactive VR scenes, which may currently be noticeable by an average HMD user.

However, as the resolution decreases for a given computer generated scene, a frequency and extent of low-resolution associated artifacts may increase in the form of jagged edges or lines ("jaggies"), pixilation, and other visual artifacts. Even if these low-resolution regions are limited to peripheral regions (e.g., the user's peripheral vision) within a foveated rendering view, an HMD user may still be able to identify certain types of aliasing due to the reduction in resolution in those regions. It has been known in the related art that while human peripheral vision is generally less resolved foveal vison, it is nevertheless sensitive to detecting certain types of visual inconsistencies or patterns. For example, if resolution is lowered enough, the user's peripheral vision would be able to detect the presence or appearance of pixilated regions, jagged edges, flickering, and other forms of aliasing or graphical artifacts. Thus, there is a need to both keep memory use low as achieved by rendering relatively lower resolutions in peripheral regions of a display while also reducing the aliasing associated with low-resolution regions within foveated rendering systems and/or views.

Systems, methods, and apparatuses described here enable foveated rendering systems and/or views to maintain a reduction in memory usage associated with lower-resolution regions while reducing an extent of pixilation and aliasing for those low-resolution regions. In one embodiment, a system or method uses temporal supersampling for a low-resolution sampling region to sample at different locations within the low-resolution pixel over a specified number of past frames to create higher resolution pixels for display. Temporal supersampling records a number of pixel values that are sampled from a number of temporally segregated frames. It should be noted that a single buffer (e.g., within video RAM) may be used to accumulate these pixel values over time, according to some embodiments. These embodiments would have an advantage of not needing to maintain multiple buffers (frames) of data. Thus, the use of temporal supersampling for a low resolution sampling area (e.g., undersampled region, or peripheral region) provides one technological solution that may be implemented to solve a problem of pixilation and aliasing associated with low-resolution areas without necessitating a substantial increase in memory use, for example.

For some embodiments, foveal regions may be fixed or static with respect to the display. In such embodiments, the foveal region may be positioned towards a center of the screen or display. In other embodiments, the foveal region may be positioned dynamically with respect to the screen or display. For example, in some embodiments, the foveal region may be defined to move within the display or screen in a predetermined manner, or as programmed by software. In other embodiments, a dynamic foveal region may track or follow a user's point of gaze (POG) or direction of gaze. As a result, areas within the display that correspond to the user's POG may be rendered at a higher quality, level of detail, and/or sharpness than areas that are farther away from the user's POG without necessarily being detrimental to the user's visual experience.

In some embodiments, a peripheral region will be defined by foveated rendering to be within the screen or display in terms of where the foveal region is not located. For example, if a foveal region is located toward the center of the display, then the peripheral region(s) should occupy the remainder of the display that is toward the periphery of the display (or at least a portion thereof). If the foveal region is to move to a different region of the display, then the peripheral region(s) should fill in the remainder of the display where the foveal region is not currently located.

Figure 1B:
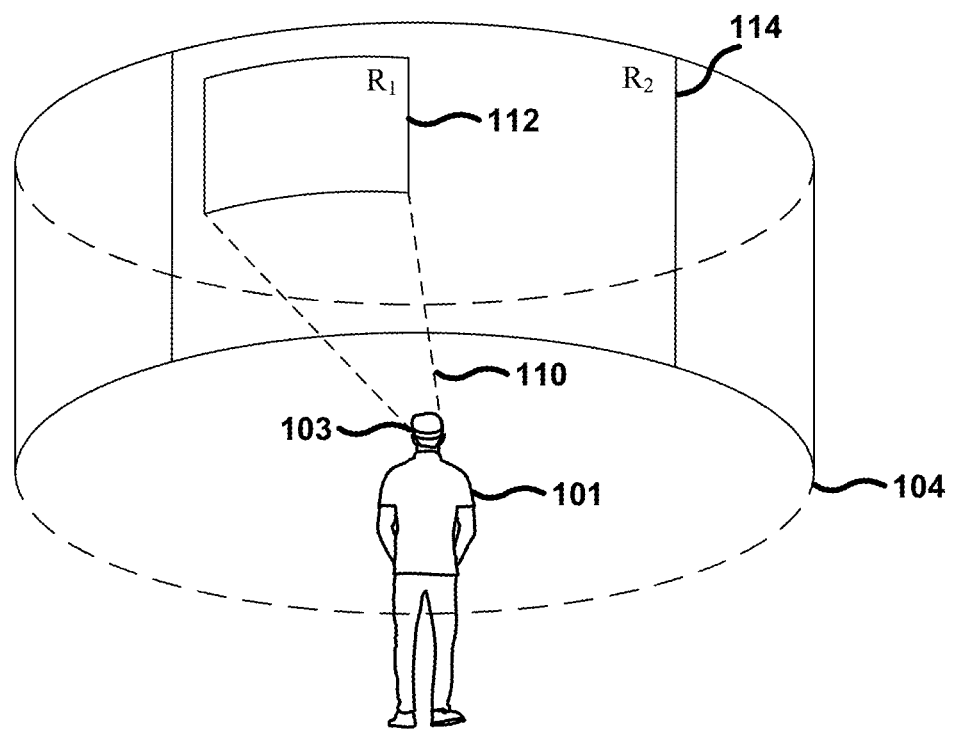

FIGS. 1A and 1B show an HMD user 101 being presented with virtual reality (VR) content within a VR environment 104 having two resolutions, $R_1$ and $R_2$. According to the embodiment shown in FIG. 1A, HMD user 101 is shown to have a gaze 102 that is being directed substantially straight ahead. That is, HMD user 101 is shown to be looking forward within the VR environment 104 that may encompass 360 horizontal degrees.

According to the embodiment shown in FIGS. 1A and 1B, the gaze HMD user 101 is being tracked by gaze detection components (not shown) located within the HMD/computing system 103 that is worn by HMD user 101. In some embodiments, gaze information may be obtained via cameras that located within the HMD that capture images of a user's eyes. The images may then be analyzed to determine a user's point of gaze or direction of gaze (e.g., where a user is currently looking). As a result, the HMD/computing system 103, having real time information on the HMD user's 101 gaze 102, is able to provide a foveal region 106 that is aligned with the gaze 102 of HMD user 101. For example, the foveal region 106 is shown to have a placement within the VR environment 104 that is a similar direction relative to the HMD user 101 as is the gaze 102 of HMD user 101. Additionally, the foveal region 106 is shown to have a resolution of $R_1$.

Also shown in FIG. 1A is a peripheral region 108. As mentioned above, the peripheral region 108 may be defined by a foveated rendering method or system to be regions within a display or field of view that does not coincide with foveal regions, according to some embodiments. For example, peripheral region(s) may be outside of a foveal region, or may surround a foveal region, or may fill in remaining spaces/pixels of a display that is not associated with foveal regions. Furthermore, non-foveated may be defined by a lower resolution, quality, level of detail, sharpness, frame rate, etc.

Thus, according to certain embodiments, the peripheral region 108 may include a region of the VR environment 104 that is displayed to the HMD user 101 but that does not correspond to the gaze 102 of the HMD user 101 as detected by the HMD/computing device 103. As a result, the peripheral region 108 may be displayed to the HMD user 101 at a resolution $R_2$ that is different from the resolution $R_1$.

According to some embodiments, resolution $R_1$ may be higher than $R_2$ for a given VR scene. In these embodiments, the foveal region 106 may be provided with a higher resolution rendering than the peripheral region 108 without necessarily being detrimental to the visual experience of HMD user 101. Generally speaking, the human visual system is only able to perceive finer detail within a region that is associated with about a 5 horizontal degrees and about 5 vertical degrees relative to a point of gaze of a person. This region of the visual field projects onto a region within the retina referred to as the fovea. As angular distance away from the user's central direction or point of gaze increases, there is a steep decline of visual acuity (e.g., the ability to perceive fine detail). This physiological phenomenon is referred to herein as foveation.

Foveated rendering leverages of the phenomenon of foveation by providing configurations, formats, and paradigms of rendering, post-rendering, and/or processing of graphics for display where one or more regions (e.g., foveal region) is defined by higher level of resolution, a higher level of detail, a higher level of texture, and/or a higher level of sharpness than other regions. According to some embodiments, the foveal region is made to correspond to a region of a display that a user is currently looking or predicted to be looking. In other embodiments, a foveal region may be placed in a central region of the display in a static manner where a user will spend a substantial amount of time looking towards. Also, as mentioned previously, foveated rendering may define peripheral region(s) that correspond to regions of the display where a user is not gazing at or predicted to gaze at.

Embodiments contemplated here are enabled to use foveated rendering display configurations to take advantage of the physiological phenomenon of foveation by rendering and/or displaying higher quality (e.g., resolution, level of detail (LOD), sharpness, frame rate) content within regions of a display that are associated with a field of view under user foveation (e.g., the center of gaze and surrounding fields that project onto a user's fovea). Additionally, embodiments contemplated here are enabled to display content having a lower quality in regions of the display that are not associated with the user's center of gaze, (e.g., the user's peripheral vision field). As a result, only a portion of a given scene may be rendered and/or processed to be displayed at high quality or high resolution under foveated rendering as compared to rendering an entire display or screen at full quality or full resolution.

One of the technological benefits of foveated rendering is the ability to reduce computational and video transmission cost associated with rendering and delivering a given scene at full quality (e.g., high resolution, sharpness, level of detail, frame rate, etc.) for the entire display (e.g., every pixel on display). Video transmission cost is present in case of both wired systems (e.g., high-definition multimedia interface (HMD) and/or display port embodiments) and wireless systems. By rendering a portion (e.g., 20-50%, 5-75%, 25-40%) of the full display at high resolution and/or quality, computational resources (e.g., GPU, CPU, cloud computing resources) and video transmission resources (e.g., transmitting data to and from the HMD from a computing device, and/or transmitting data from a combined HMD/computing device to remote servers) may be reduced and allocated for other uses.

According to another embodiment, even if a GPU associated with an HMD/computing device computes full resolution video frames for a given scene, foveated rendering methods and/or systems may enable a reduction in an amount of data that is needed for displaying the scene on the HMD. For example, if the GPU is associated with a computing device that is connected wirelessly to the HMD, then foveated rendering methods and/or systems described here may enable a reduction in an amount of wireless data that is transmitted to the HMD from the computing device for presenting certain regions of the scene.

According to the embodiment shown in FIG. 1A, foveal region 106 represents about 30% of the total displayed or viewable area. Although foveal region 106 is shown to be rectangular in shape for the sake of clarity, it should be noted that foveal region 106 may take on any number of shapes without departing from the spirit and scope of the embodiments. Some of the contemplated embodiments are described below with reference to FIGS. 3A-3F. Again, although the foveal region 106 is shown to represent 30% of the total displayable or viewable area, the foveal region 106 may range anywhere from 5% to 75% of the total displayable or viewable area in other embodiments.

In one embodiment, it is contemplated that the peripheral region 108 may have a resolution $R_2$ that is less than the resolution $R_1$ of the foveal region 106 for at least some period of the VR scene. For example, if $R_1$ is equivalent to 1920×1080 pixels (e.g., 1080 p), $R_2$ may be equivalent to 960×540 pixels (e.g., 540 p), or roughly half the number of vertical pixels and half the number of horizontal pixels. As a result, the foveal region 106 having a resolution $R_1$ of 1080(p) may be associated with an image resolution equivalent to about 2.074 megapixels. In contrast, the peripheral region 108 having a resolution $R_2$ of 540(p) may be associated with an image resolution that is equivalent to about 0.518 megapixels, demonstrating a difference in image resolution of a factor of about 0.25 with respect to resolution $R_1$.

According to another embodiment, it is contemplated that foveal region 106 may be associated with a resolution $R_1$ of 3840×2160p (4K UHD) whereas the peripheral region 108 may be associated with a resolution $R_2$ that is less than 4K UHD, for example, 1080(p), 540(p), 360(p), 240(p), etc. There are any number of other resolutions that may be used in other embodiments according to the methods and systems presented here. As non-delimiting examples, it is contemplated that the foveal region 106 may have a resolution $R_1$ that is characterized by the following resolutions: 2160×1200 (or 1080×1200 per eye), 1280×720 (HD), 1600×900 (HD+), 1920×1080 (FHD), 2560×1440 ((W)QHD), 3200×1800 (QHD+), 3840×2160 (4K UHD), 5120×2880 (5K UHD+), 7680×4320 (8K UHD), 16K, and so on. The example resolutions discussed here are no delimiting or exhaustive, but are simply meant to provide an illustration of certain standards that may be implemented in certain embodiments.

According to some embodiments, the resolution $R_2$ may be characterized by any resolution that is less than that of $R_1$. As non-limiting examples, $R_2$ may be characterized by the following resolutions: 320×240 (240 p), 640×360 (nHD, 360 p), 960×540 (qHD, 540 p), 1280×720 (HD, 720 p), 1600×900 (HD+), and so on. It is contemplated that $R_1$ and $R_2$ may change throughout the course of a VR scene and/or between different VR scenes, depending on the various embodiments. Again, the discussed resolutions are meant to be examples only, and do not limit the various other resolutions, standardized or not, that may be implemented in various embodiments.

FIG. 1B illustrates the HMD user 101 directing his gaze 110 toward the upper left-hand corner of the peripheral region 114 within the VR environment 104. According to some embodiments, gaze 110 is detected by HMD/computing device 103, which is then enabled to provide foveal region 112 within the VR environment at a location that corresponds with gaze 110. That is, the gaze 110 is being tracked by HMD/computing device 103 in real time, and, as a result, HMD computing device 103, is able to determine where to foveate the VR environment such that the foveal region 112 is in the same direction as the center of gaze associated with gaze 110. Thus, there is a transition between the location of foveal region 106 in FIG. 1A to a new location associated with the foveal region 112 of FIG. 1B that naturally tracks or traces the change between gaze 102 of FIG. 1A and gaze 110 of FIG. 1B.

Although certain embodiments have been shown to have a dynamic foveal region that tracks a user's gaze direction, other embodiments may include a fixed foveal region that does not track a user's gaze direction.

Figure 2A:
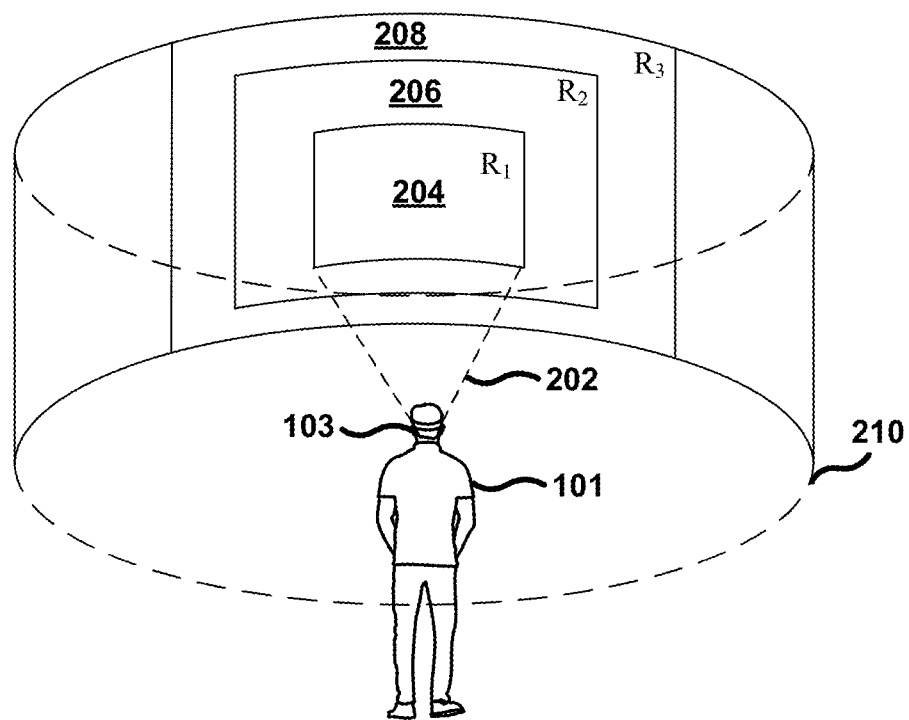
FIGS. 2A and 2B show an HMD user being presented with VR content having a foveal region, an intermediate foveal region, and a peripheral region, in accordance with certain embodiments.

FIG. 2A shows an HMD user 101 being presented with VR content within VR environment 210 having a foveal region 204, an intermediate foveal region 206, and a peripheral region 208. It is contemplated that some embodiments may have a foveal region 204 with a resolution $R_1$ that is greater than the resolution $R_2$ of the intermediate foveal region 206. Furthermore, according to some embodiments, it is contemplated that resolution $R_2$ is to be greater than resolution $R_3$ of the peripheral region 208. Also, similar to the embodiments shown in FIGS. 1A and 1B, the foveal region 204 is shown in FIG. 2A to occupy a region within the VR environment 210 that coincides with the instantaneous gaze 202 of HMD user 101. However, as mentioned earlier, other embodiments may implement foveated rendering in which the foveal region 204 and the intermediate foveal region 206 are fixed relative to the display area and need not track a user's gaze direction.

According to the embodiment shown in FIG. 2A, the intermediate foveal region 206 generally surrounds a region occupied by the foveal region 204 within the VR environment 210. As a result, the intermediate foveal region 206 may coincide with a region within the VR environment 210 that is associated with an angular distance away (eccentricity) from the central gaze of about 5° to about 60°. Visual acuity associated with this space in the visual field (e.g., intermediate foveal region) is less than that of the foveal region, but may still be greater than that of the peripheral region (having an eccentricity of greater than about 60° relative to the center of the gaze direction). As a result, method and systems described herein are enabled to provide an intermediate foveal region 206 having a resolution that is in between that of the foveal region 204 and the peripheral region 208.

According to one embodiment, foveal region 204 may have a resolution $R_1$ that is characterized by 1080 p, while intermediate foveal region 206 may have a resolution $R_2$ that is characterized by 720 p, and the peripheral region 208 characterized by 540 p. These resolutions are only examples, and it is envisioned that the foveal region 204 may take on higher resolutions, e.g., 4K, 8K, 16K, etc. In these other embodiments, the intermediate foveal region 206 may have a resolution that is less than that of the foveal region 204, while the peripheral region 208 will have a resolution that is less than that of the intermediate foveal region 206.

It is also contemplated that the intermediate foveal region 206 is to occupy a space within the VR environment 210 that is in between the foveal region 204 and the peripheral region 208. It is also contemplated that the intermediate foveal region 206 and the peripheral region 208 tracks or follows the gaze 202 of HMD user 101 or tracks or follows the foveal region 204 within the VR environment 210. That is, the intermediate foveal region 204 and the peripheral region 208 are also enabled to translocate within VR environment 210 so as to move with or appear to move with the foveal region 204 in real time.

Figure 2B:
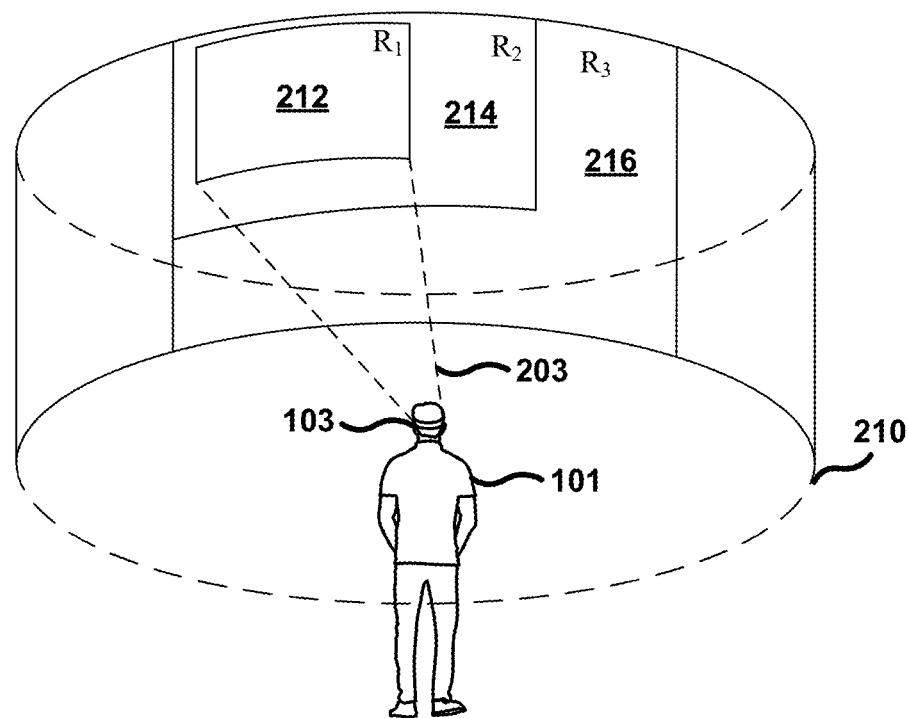

FIG. 2B shows that HMD user 101 has changed from a gaze 202 that is directed substantially straight ahead in FIG. 2A to a gaze 203 that is directed to an upper left-hand corner of the VR environment 210. According to some embodiments, gaze 203 is tracked by HMD/computing system 103 via gaze detection, and, as a result, HMD/computing system 103 is enabled to position foveal region 212 in a similar direction that gaze 203 is directed to. HMD/computing system 103 is also enabled to provide the intermediate foveal region 214 at a location within VR environment 210 that surrounds a region that the foveal region 212 occupies.

As noted above, the foveal region 212 may be made to correspond to about 5-75% of a visual field of HMD user 101, or to 5-75% of the total displayable space within the VR environment 210. Further, the intermediate foveal region 214 may correspond to about, for example, another 5-50% of the visual field of HMD user 101 or to about 5-50% of the total viewable area of VR environment 210, depending on various embodiments. Peripheral region 216 may, as a result, correspond to anywhere between 40-90% of the total visual field and/or the total viewable area of the viewable area. It is contemplated, however, that the proportion of the visual field and/or the viewable area of VR environment 210 that is allocated to each of the foveal region 212, intermediate foveal region 214, and peripheral region 216, may change within VR scenes or between different VR scenes, depending on various embodiments.

Figure 3A:
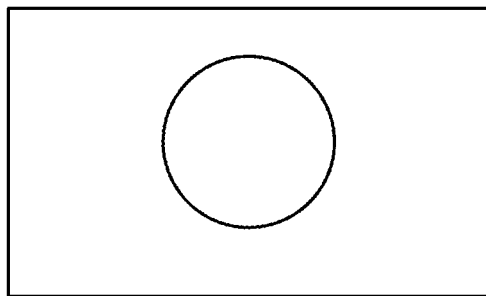
FIGS. 3A-3H show various embodiments of foveated rendering views.
Figure 3B:
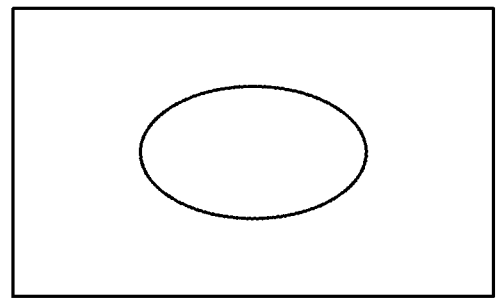
Figure 3C:
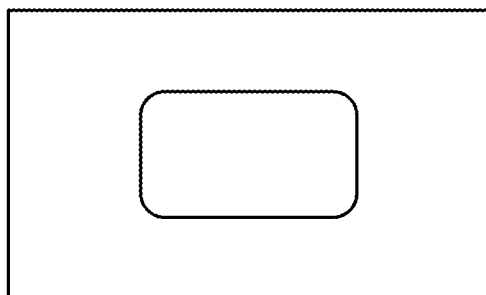

FIGS. 3A-3H show various embodiments of foveated rendering views. For example, FIG. 3A illustrates a foveated rendering display having a foveal region that is characterized by a circular boundary. FIG. 3B illustrates a foveated rendering view that may be used with methods and systems described here having a foveal region that is characterized by an ellipsoidal, or oblong, or oval shape. Further, FIG. 3C shows an embodiment of a foveated rendering configuration where a foveal region is shown to be a rectangular shape with rounded corners.

Figure 3D:
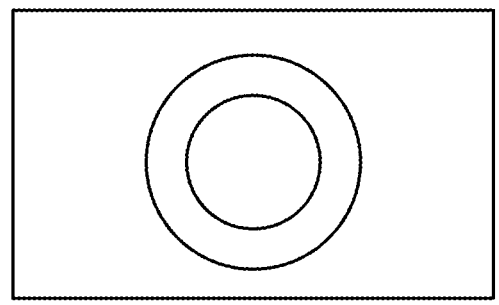
Figure 3E:
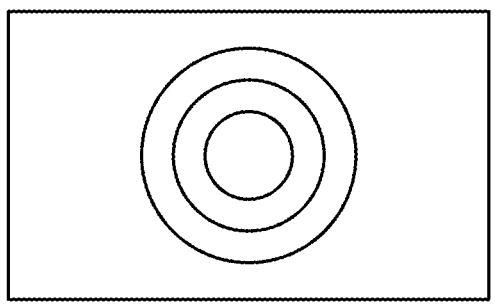

FIGS. 3D and 3E illustrate embodiments of foveated rendering views having foveal regions that are circular. FIG. 3D additionally shows an intermediate foveal region, also circular in shape, which lies outside of the foveal region in between the foveal region and the peripheral region(s). Moreover, FIG. 3E illustrates two intermediate foveal regions that are arranged in a nested manner. It is contemplated that, generally, any number of intermediate foveal regions may be utilized with various embodiments, with each successive intermediate foveal region that is farther and farther away from the foveal region having a progressively lower quality (e.g., resolution, sharpness, level of detail, frame rate, refresh rate) associated with it. It is further contemplated that although intermediates are shown to be of a similar shape as a given foveal region within a foveated rendering display, this similarity does not need to be the case in other embodiments. For example, the intermediates of FIGS. 3D and 3E may be characterized by shapes other than circles.

Figure 3F:
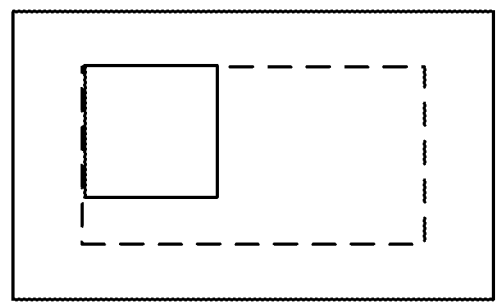

FIG. 3F shows an embodiment of a foveated rendering view and/or display having a dynamic foveal region that is bounded by a box. In these and other embodiments, the foveal region may track a user's gaze such that the foveal region is shown within an area of the display and/or view that coincides with a gaze direction of an HMD user as long as the user's gaze remains within a certain area that is characterized by the bounded box. As a result, the foveal region may track the gaze of the user up until the gaze moves outside of the bounded box. According to some embodiments, the foveal region may still attempt to track a gaze that is outside of the bounded box by translocating to a position within the bounded box that is determined to be closer to the gaze than other locations. Of course, the geometries and shapes shown in FIGS. 3A-3F are meant to be exemplary and not limiting. For example, any number of other shapes or boundaries may be used to define foveal regions and/or intermediate foveal regions in accordance with methods and systems described here, including squares, trapezoids, rhombuses, and other polygons.

Generally speaking, each of the embodiments shown in FIGS. 3A-3E may have either foveal regions that are 'fixed' relative to the display and/or view or that dynamically track a gaze of a user when viewing the respective foveated rendering views and/or displays. For example, for certain types of VR content, it may be the case that the HMD user is expected to be looking straight ahead for a majority of a VR session. As a result, certain embodiments may use foveated rendering views and/or displays that are fixed relative to the display and/or view of the VR environment.

Figure 3G:
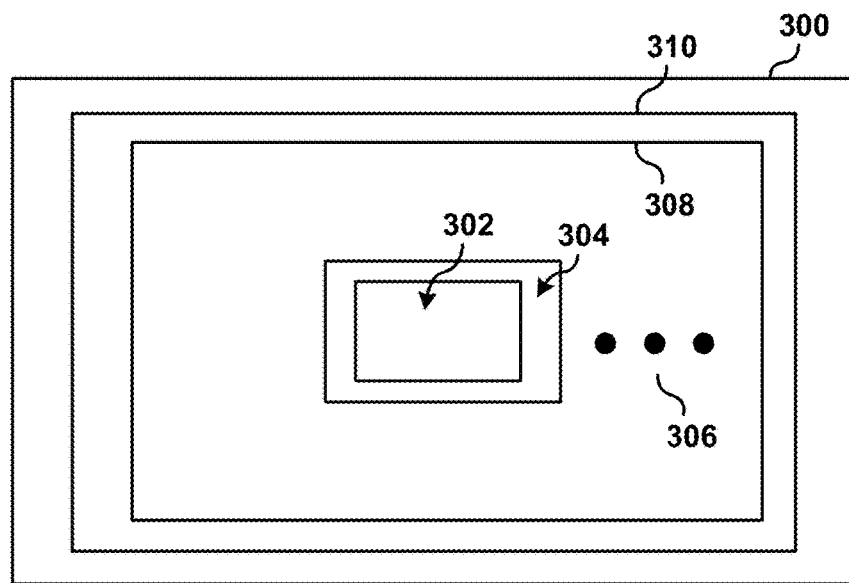

FIG. 3G illustrates a VR scene 300 produced using foveated rendering according to the methods and systems described here. The foveated rendering produces a foveal region 302 and a number of intermediate foveal regions 304-310. The number of intermediate foveal regions 304-

310 is arbitrary in FIG. 3G, with each intermediate foveal region having successively reduced resolutions as the intermediate foveal region is displayed farther and farther away from the foveal region. For example, intermediate foveal region 306 may include anywhere between 1 and 100 additional intermediate foveal regions.

Figure 3H:
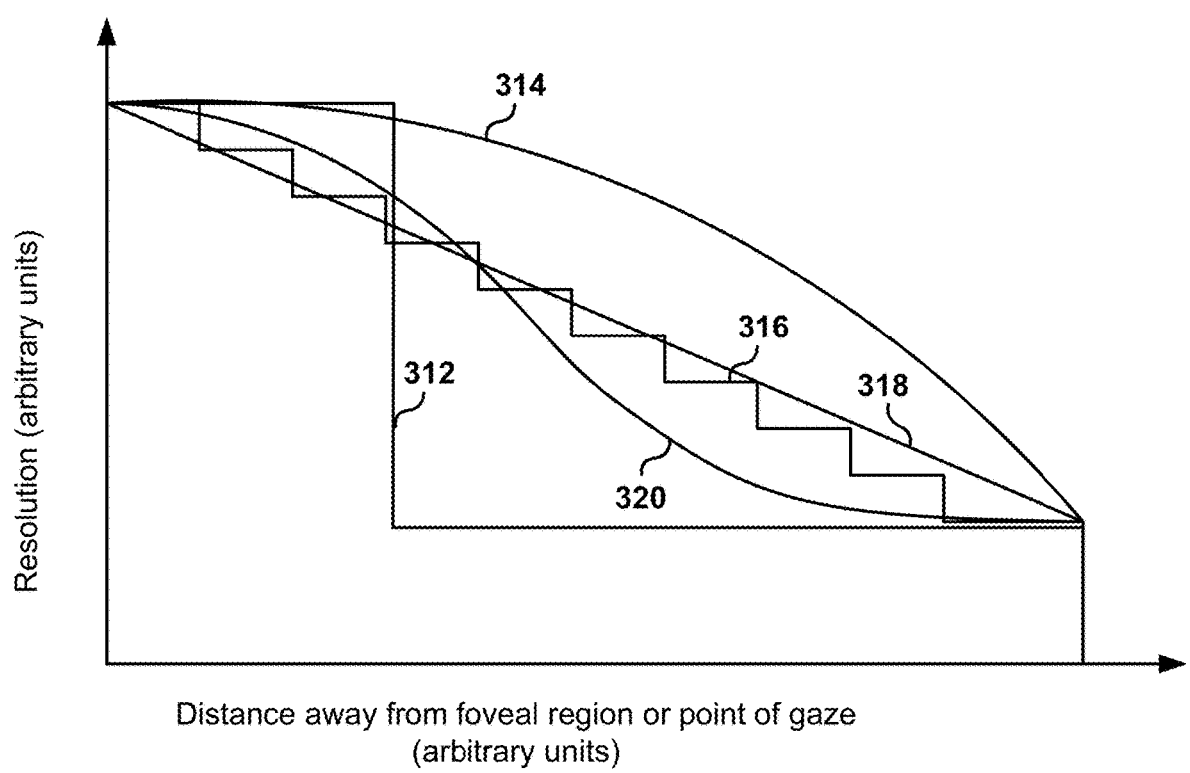

FIG. 3H describes various exemplary relationships between a resolution for a region of display and the region's distance away from a foveal region or a point of gaze. For example, curve 312 might describe a foveated rendering display having only a foveal region and a peripheral region. Curve 314 describes a foveated rendering display having a parabolic relationship between resolution and a distance away from the foveal region. Curve 316 describes a step function that reduces in resolution as a distance away from the foveal region increases. Moreover, curves 318 and 320 describe a linear and sigmoidal relationship between resolution and distance away from the foveal region. As a result, foveated rendering system contemplated here are capable of rendering any number of intermediate foveal regions having various resolutions as each intermediate foveal region is further removed from the foveal region.

Figure 4:
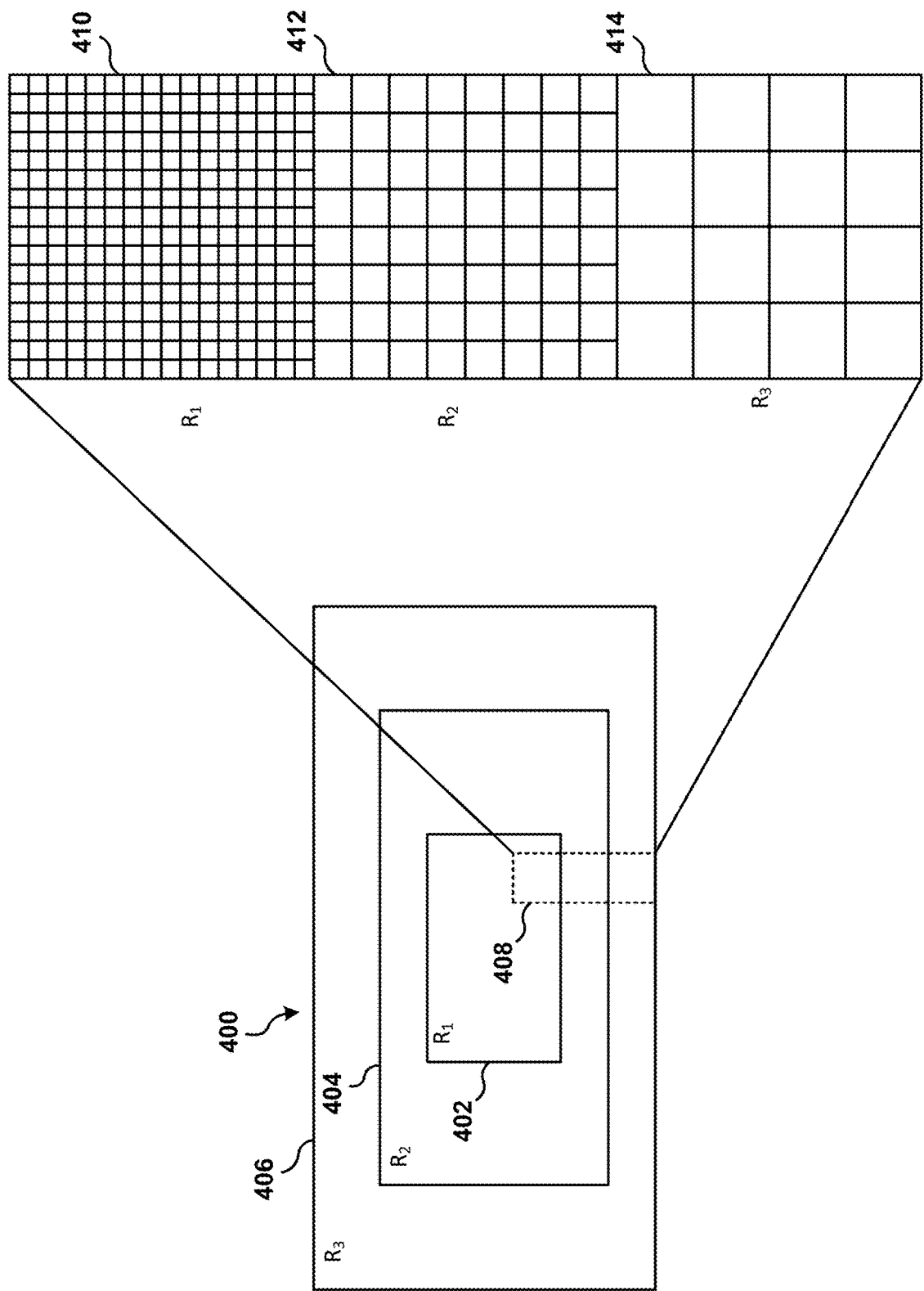
FIG. 4 shows a multiresolution display or screen that is defined by a foveated rendering view and an expanded view of associated relative pixel sizes, according to certain embodiments.

FIG. 4 shows a display or screen that is defined by a foveated rendering view 400 and an expanded view 408 of associated relative pixel sizes, according to certain embodiments. For example, the foveated rendering view 400 is shown to include a foveal region 402 with resolution $R_1$, an intermediate foveal region 404 with resolution $R_2$, and peripheral region 406 with resolution $R_3$. It is contemplated that the resolutions for each of the regions 402, 404, and 406 will generally have the following relationship $R_1 > R_2 > R_3$, although other relationships are possible.

An expanded view 408 of the three regions 402-406 is shown to include relative pixel sizes for a foveal region pixel 410, an intermediate foveal region pixel 412, and a peripheral region pixel 410. As mentioned above, the resolution $R_1$ of foveal region 402 may be greater than resolution $R_2$ of intermediate region 404, and, as a result, the foveal region pixel 410 should be smaller in size than the intermediate foveal region pixel 412. In the embodiment of FIG. 4, as just one example, the intermediate region pixel 412 is shown to be about 4 times larger in size than the region pixel 410. That is, the intermediate foveal region pixel 412 may occupy or fill in or map to the same amount of screen/display area as 4 of the foveal region pixels 410. Thus for example, if the foveal region pixel 410 corresponds to a native resolution pixel, then each of the intermediate region pixels 412 may be associated with 4 of the native pixels.

According to some embodiments, even though an intermediate region pixel 412 may include or be associated with more than one (e.g., 4, or 9, or 16, or any other number) native/physical pixels, the intermediate region pixel 412 may still be referred to as one (lower-resolution) pixel because it is treated as a single pixel by a graphics pipeline for at least part of the rendering process. For example, the graphics pipeline of a VR system may store only one color value for pixel 412 per frame rendered. When the VR system subsequently proceeds to display pixel 412, it may then map or project the color value stored for pixel 412 to each of the 4 native pixels. As a result, a "low-resolution pixel" or a "big pixel" may be used herein to refer to an element for an eventual view that is treated as a single pixel (e.g., by a graphics pipeline) by being associated with only one color value per rendered frame, but that eventually maps to or projects onto more than one native or physical pixels on a display (associated with the HMD).

Further depicted by FIG. 4 is a peripheral pixel 414, which is shown to be even lower in resolution than intermediate pixel 412. For example, peripheral pixel 414 is shown to be 4 times the size of intermediate pixel 412 and 16 times the size of foveal pixel 410. As a result, the peripheral pixel 414 may include 16 native pixels, and may also be considered a low-resolution pixel or a big pixel, since the foveal pixel 414 is treated as a single pixel having only one color value stored per frame while also projecting onto more than one pixel.

Figure 5:
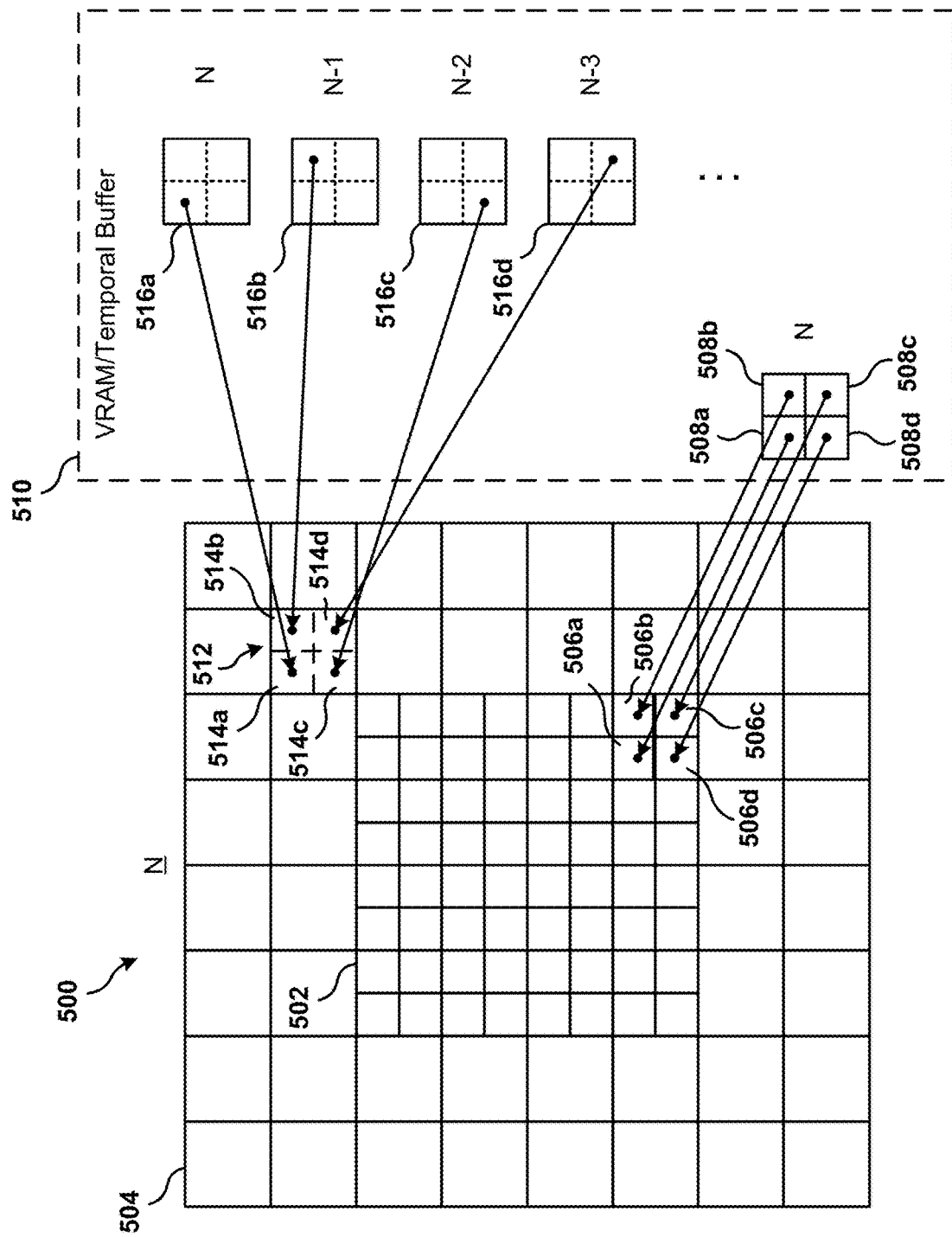
FIG. 5 shows a screen defined by a foveated rendering view having a foveal region, an intermediate foveal region, and a peripheral region, as well as a conceptual scheme for reconstituting higher resolutions pixels in the low resolution peripheral region, according to some embodiments.

FIG. 5 shows a representative display 500 being defined by a foveated rendering view having a foveal region and a peripheral region. The foveal region is shown to include an array of an array of representative pixels 502 that may correspond to the native pixels of the display 500. The peripheral region(s) is shown to include an array of low resolution pixels 504, which, for example, may be associated with 4 native pixels each. According to the embodiment shown, each of the high resolution pixels 506a, 506b, 506c, and 506d for frame N is drawn from corresponding pixel data 508a, 508b, 508c, and 508d stored in a temporal buffer 510 for frame N.

Certain aspects of the embodiments described here allow for "low-resolution" pixels to be rendered in higher resolution by drawing pixels that are associated with the lower-resolution pixel from low resolution pixel data stored in a temporal buffer. For example, low resolution pixel 512 is shown to include native pixels 514a, 514b, 514c, and 514d, each of which is drawn from a low resolution pixel value stored for different frames. In particular, native pixel 514a is drawn from pixel data 516a, which is a pixel value for the low resolution pixel 512 at frame N that is obtained by jittering and sampling in the upper-left corner of the low resolution pixel.

Native pixel 514b is shown to be drawn from pixel data 516b, which includes a pixel value for the same low-resolution pixel 512, but from a prior frame (N-1) and a different jittered location (e.g., upper-right corner). Furthermore, native pixel 514c is drawn from pixel data 516c, which includes a pixel value that is obtained from frame N-2 and from a different jittered location (e.g., bottom-left corner). Moreover, native pixel 514b is shown to be drawn from pixel data 516d that includes a sampled pixel value for frame N-3 at a bottom-right jittered location.

As a result, a higher resolution display output may be achieved for low-resolution pixel 512 by drawing native pixels 514a-514d according to pixel data 516a-516d stored in a temporal buffer for previous frames having been jittered accordingly without necessarily increasing the number of pixel values needed to be stored for each frame. For example, there is only one color value stored for each of frames N, N-1, N-2, and N-3 for the low resolution pixel 512. In contrast, there are 4 pixel values stored for the group of high-resolution pixels 506a-506d for frame N alone (and presumably 4 more pixel values for each of frames N-1, N-2, and N-3, and so on).

That is, for the group of 4 high resolution pixels 506a-506d, the number of pixel values needed per frame is 4 pixel values. In contrast, the group of 4 pixels 514a-514d associated with the low-resolution pixel 512, although being of the "same resolution" as the group of the high resolution pixels 506a-506d, only requires that one pixel value or color be stored per frame in the temporal buffer. Thus, embodiments described here enable displaying and/or building higher resolution pixels in low-resolution pixel regions without needing to increase the number of pixel values stored in the temporal buffer 510 per frame (e.g., without increasing memory usage). According to some embodiments, the process of drawing native pixels 514a-514d from temporally defined low-resolution pixel data stored in temporal buffers may utilize temporal supersampling to sample different locations of the low-resolution pixel.

Figure 6:
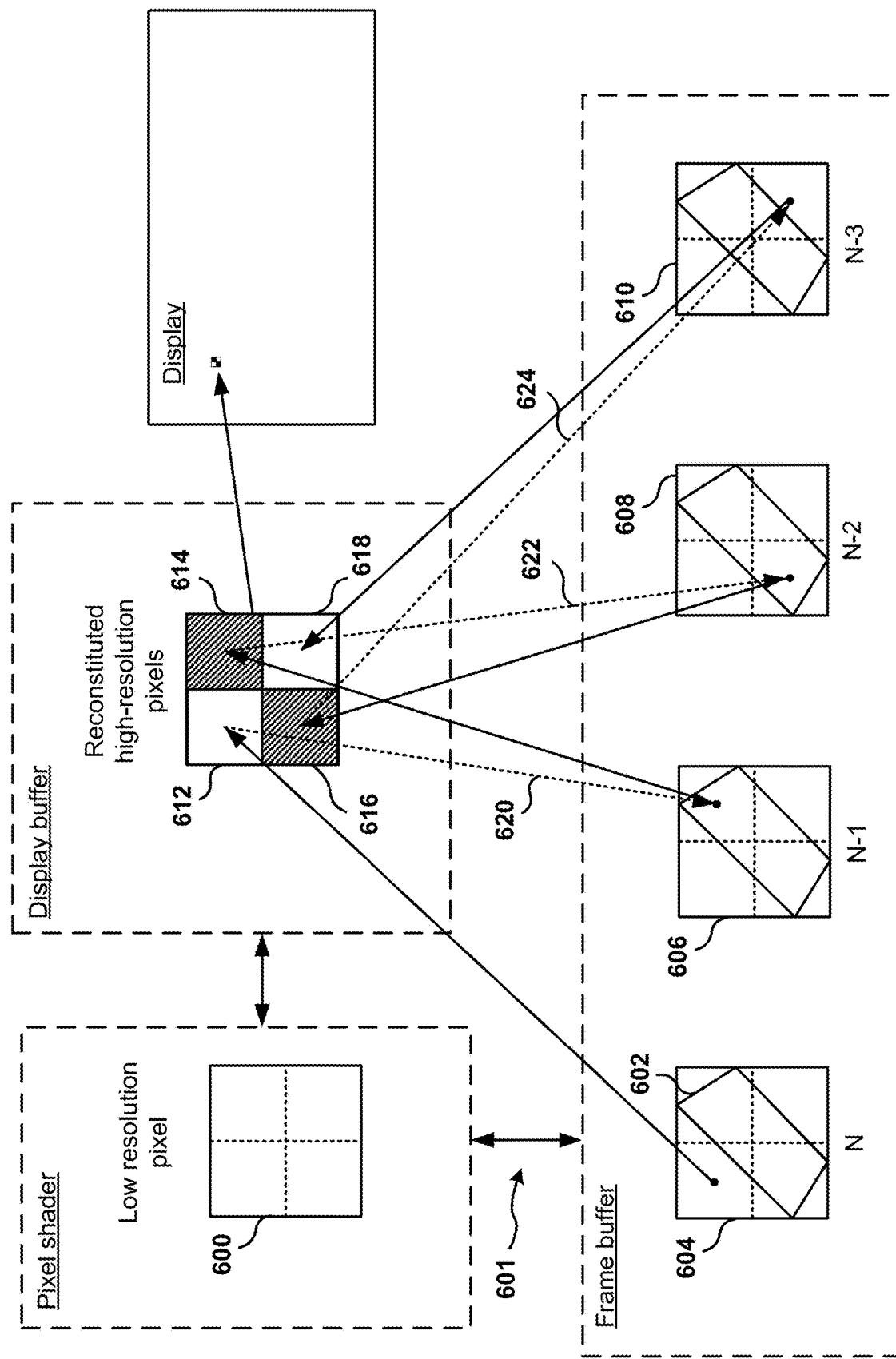
FIG. 6 shows a conceptual scheme for reconstituting a set of higher resolution pixels from a low resolution sampling area using temporal supersampling with pixel reprojection over a number of frames stored in buffer, according to various embodiments.

FIG. 6 shows a conceptual scheme for creating a set of higher resolution pixels from a low resolution pixel 600 using temporal supersampling 601 of the low resolution pixel 600 and pixel reprojection from the temporal supersampling history of the low resolution pixel 600, according to various embodiments. For example, a low-resolution pixel 600 is shown to be coffered into 4 regions that correspond to 4 high-resolution pixels. During temporal supersampling 601 of an object 602, the low-resolution pixel 600 is shown to be sampled at a different location for each of the four frames N, N-1, N-2, and N-3. For the sake of clarity, the sample locations happen to be in the center of each of the coffered regions of the low-resolution pixel 600 in the embodiment shown.

According to various embodiments, sampled pixel 604 of object 602 has a sample location within the upper-left region of low resolution pixel 600 for frame N, which returns a pixel value that is stored in memory and is subsequently projected to a corresponding high resolution pixel 612. Thus, according to the embodiment shown, sampled pixel 604 of object 602 may return a pixel value corresponding to background color (e.g., white). Likewise, sampled pixel 606 for frame N-1 may return a color value that corresponds to a color of object 602. As a result, an associated graphics pipeline may project the sampled color value (e.g., gray as shown) to the upper-right high resolution pixel 614. The same process may be repeated for frames N-2 and N-3, in which sampled pixel 608 is made to project a respective sampled color value to the bottom-left high resolution pixel 616 and the sampled pixel 610 is made to project a respective sampled color value to the bottom right high resolution pixel 618.

According to certain embodiments, projection of sampled pixel values from sampled pixels 604-610 is enabled by having information with respect to the jittered sampling location and the corresponding screen coordinates or pixel coordinates for the sampled location. For example, the graphics pipeline of a VR system compatible with the embodiments described here may determine where to project the respective sampled color values based on information with respect jitter as well as information with respect to corresponding screen coordinates or pixel coordinates for a given sample location.

In one embodiment, temporal anti-aliasing reprojection may be used to perform the reprojection shown in FIG. 6. For example, the following exemplary equations may be used in some embodiments:

$$\text{WorldPosition} = \text{CurrentViewProjectionInverse} * \text{ScreenPosition} \quad (1)$$

$$\text{PreviousScreenPosition} = \text{PreviousViewProjection} * \text{WorldPosition} \quad (2)$$

$$uv = \tfrac{1}{2} * (\text{PreviousScreenPosition}.xy / \text{PreviousScreenPosition}.w) + \tfrac{1}{2} \quad (3)$$

According to certain embodiments, the above equations (1)-(3) may be used to sample previous frames stored in the temporal buffer. For example, equation (1) enables a mapping of the current pixel back into world space. Equation (2) uses the previous frame's camera (View Projection matrix) to project that position on the previous frame, and equation (3) converts the previous screen position into uv coordinates that may be used to sample the previous frame in the temporal buffer. As a result, the associated graphics pipeline will know where to sample for previous frames (e.g., frames N-1, N-2, N-3, etc.). For example, the dashed lines shown in FIG. 6 may represent the reprojection using the derived uv coordinates for determining a location that is to be sampled for each previous frame. In particular, reprojection 620 may causes a change (e.g., 0.5 pixels in x) in sampling location between sampled pixel 604 and 606 for frames N and N-1, respectively. Likewise, reprojections 622 and 624 cause a jitter in uv coordinates that change a sampling location between sampled pixels 606 and 608 (e.g., −0.5 pixels in x and −0.5 pixels in y), and between sampled pixels 608 and 610 (e.g., +0.5 pixels in x). According to some embodiments, the sampling locations may be defined by a jitter.

Figure 7:
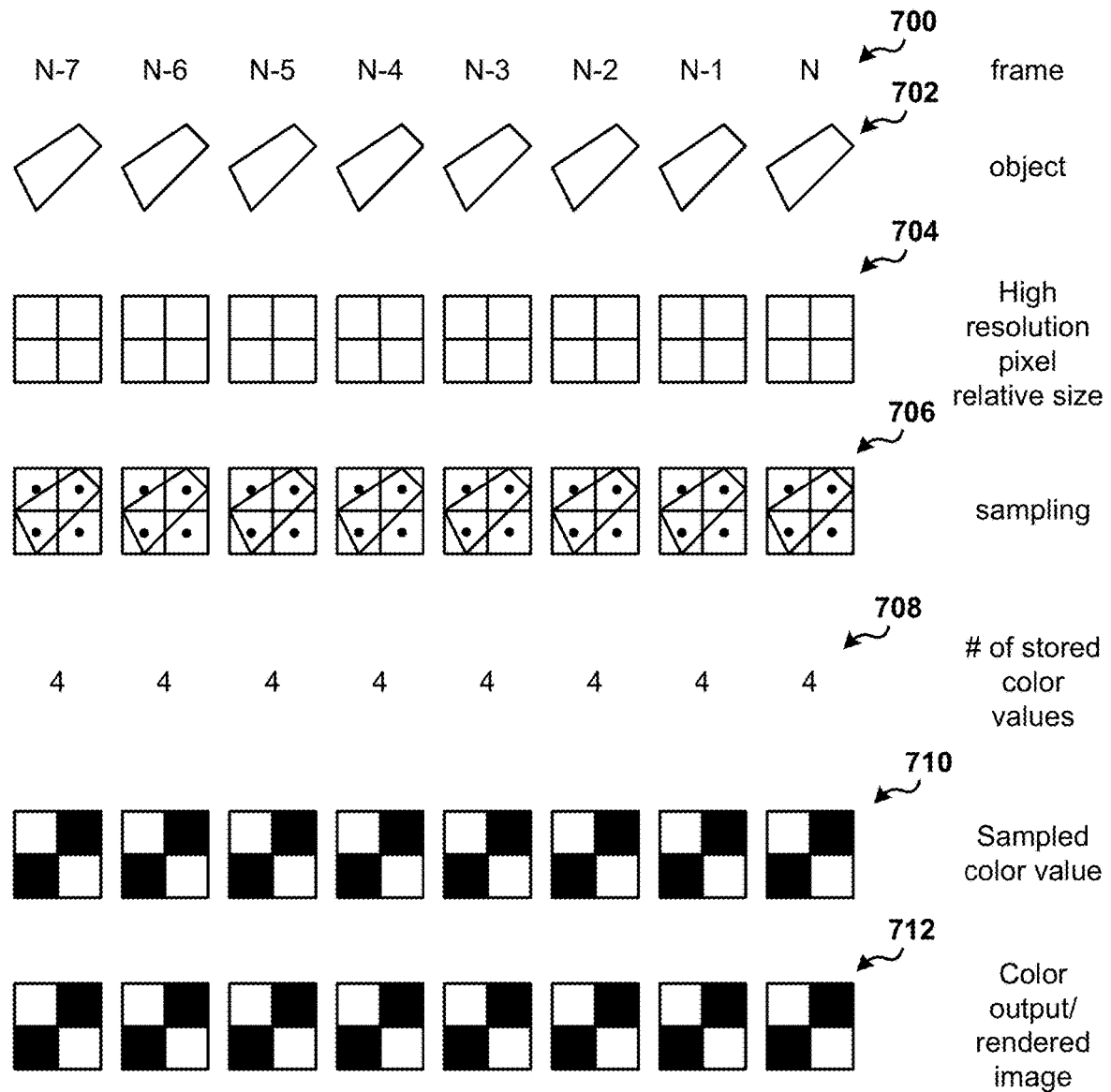
FIG. 7 shows a conceptual scheme of outputting high resolution pixels using high resolution sampling regions, according to one embodiment.

FIG. 7 shows a conceptual scheme of outputting a set of four high resolution pixels 712 using a group of high resolution pixels 704 for sampling 706 an object 702 over a plurality of frames 700, according to one embodiment. In the embodiment shown, there is an object 702 that remains static across a plurality of frames 700 (e.g., N, N-1, ..., N-7). The set of high resolution pixels 704 is shown to be sampled at locations corresponding to the center of each of the high resolution pixels 704 for sampling 706 of object 702. Each of the sampled locations during sampling 706 results in a color value that is stored in memory. For example, since there is a sampling location in each of the high resolution pixels 704 during sampling 706, there will be 4 stored color values 708 for the group of high resolution pixels 704 per frame.

Also shown in FIG. 7 are the sampled color values 710 for each of the four high resolution pixels 704 for each of the plurality of frames 700. For the sake of clarity, the object 702 may correspond to a color of black, and, as a result, the sampled color values 710 for two of the four high resolution pixels 704 may return a color value of black. The remaining two high resolution pixels may return a color value corresponding to white. The resulting color output/rendered image 712 will reflect the sampled color values 710 for the set of high resolution pixels 704, and may be displayed accordingly on a screen associated within a head mounted display (HMD). According to some embodiments, the color output 712 for the set of high resolution pixels 704 may correspond to native pixels and be mapped to a foveal region of the display.

Figure 8:
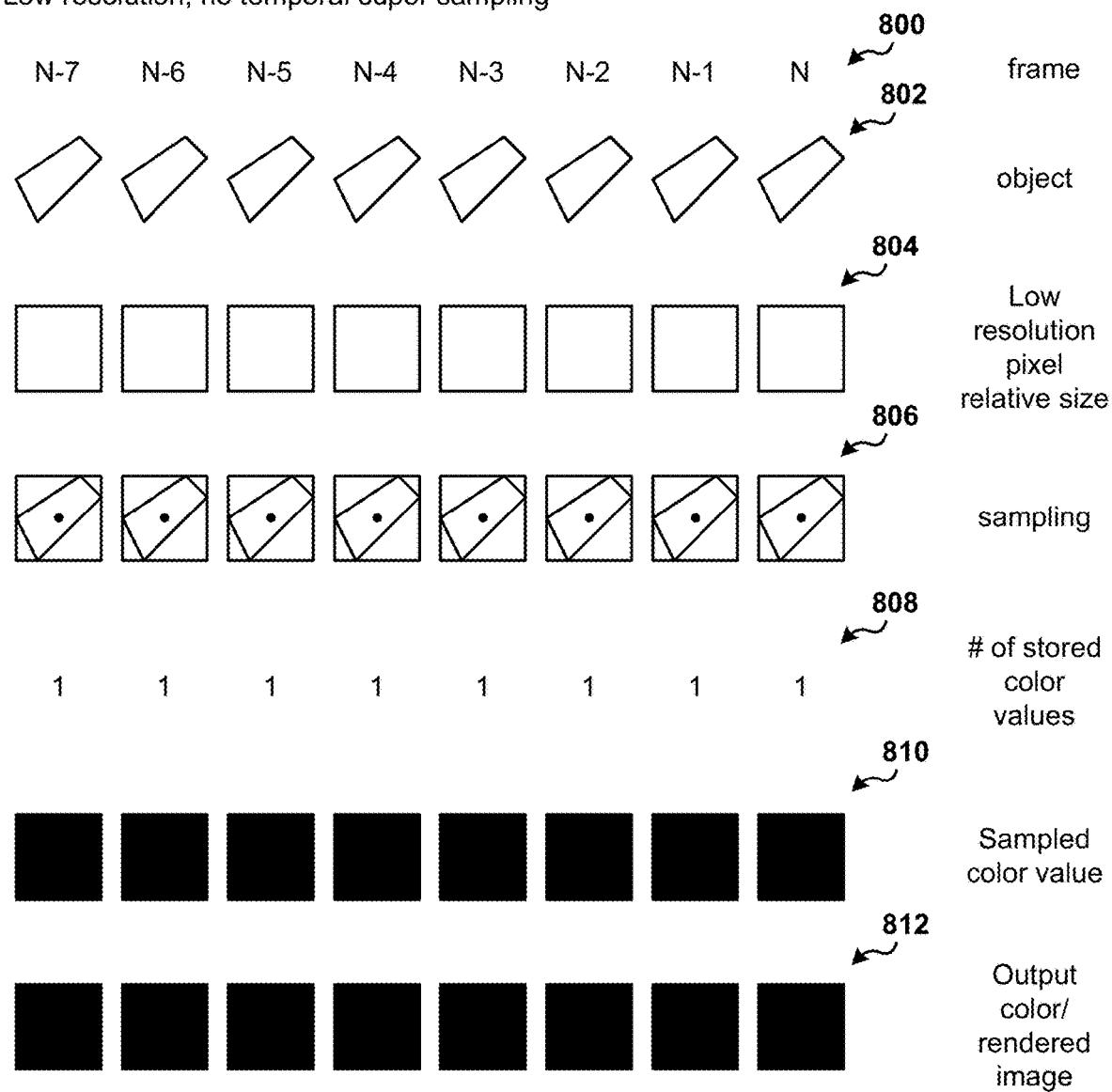
FIG. 8 shows a conceptual scheme of outputting low resolution pixels using a low resolution sampling region, according to one embodiment.

FIG. 8 illustrates a conceptual scheme of rendering an object 802 using low resolution pixels 804 over a plurality of frames 800. The object 802 is shown to be static over the plurality of frames 800. The low resolution pixel 804 is shown to be about 4 times the size of a high resolution pixel in FIG. 8. For example, if each of the high resolution pixels 704 corresponded to a native pixel of the display of an HMD, then the low resolution pixel 804 may include 4 of the native pixels.

During sampling 806, the low resolution pixel 804 is shown to be sampled at a center of the low resolution pixel 804 at each frame, and results in 1 stored color value 808 per frame. The sampled color value 810 (e.g., black) for the whole low resolution pixel 804 is shown to result from the sampling 806 of object 802 using a low resolution pixel 804. The output color/rendered image 812 for the plurality of frames 800 is shown to reflect the sampled color values 810. For example, the output color/rendered image 812 is shown to be a 'big pixel' that includes one color of black. According to some embodiments, the output color/rendered image 812 may be mapped to a peripheral region(s) of the HMD display that is associated with lower resolutions.

Figure 9:
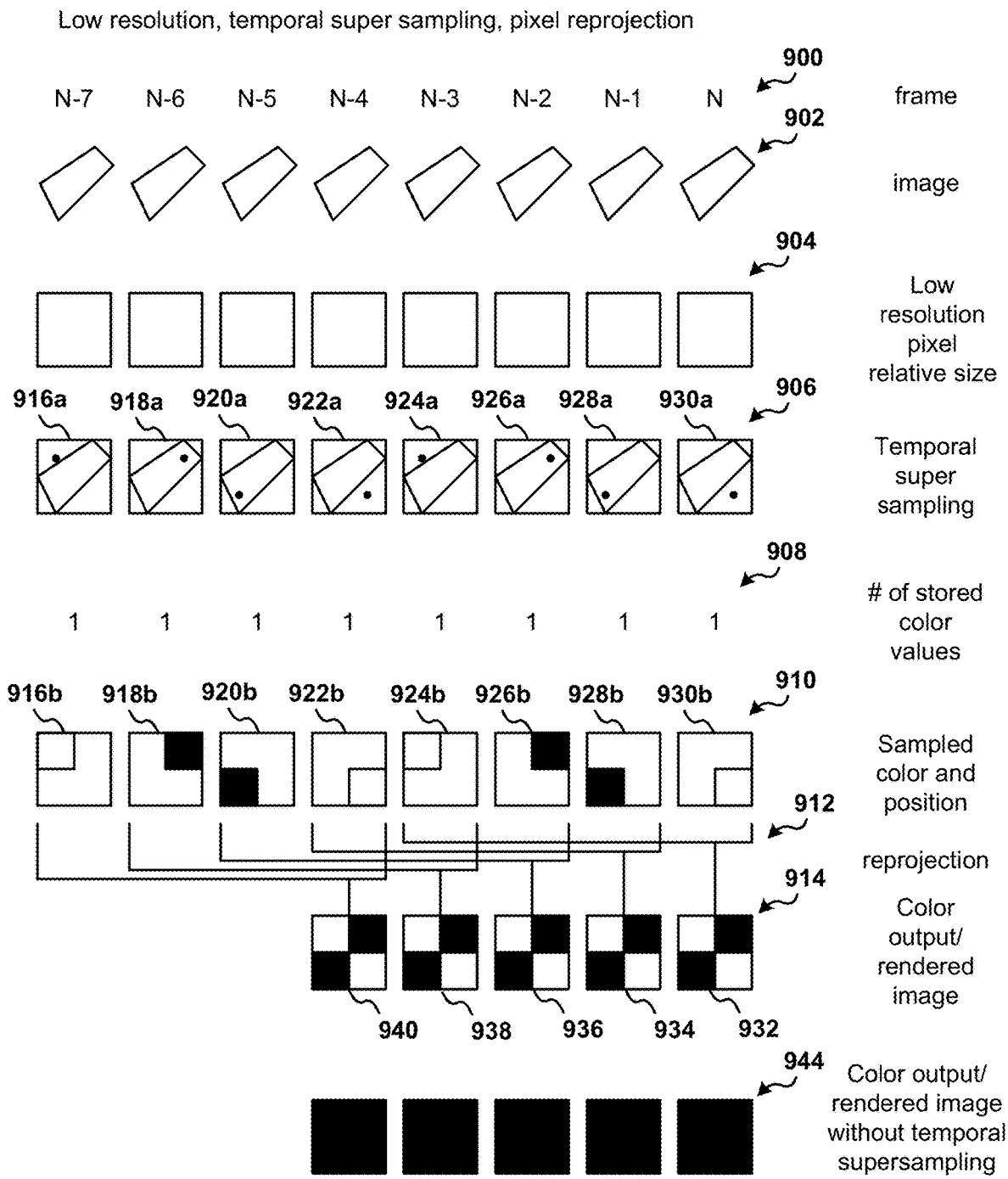
FIG. 9 shows a conceptual scheme of outputting high resolution pixels for a static object using a low resolution sampling region through temporal supersampling, according to one embodiment.

FIG. 9 shows a conceptual scheme of using temporal supersampling 906 of low resolution pixels 904 and reprojection 912 for enabling a color output/rendered image 914 having a higher resolution relative to the low resolution pixels 904. Similar to FIGS. 7 and 8, an object 902 is shown to be static across a plurality of frames 900 (frames N, N-1, . . . , N-7). Also, similar to the low resolution pixels 804 of FIG. 8, low resolution pixels 904 are shown to be used for rendering the object 902. However, unlike the sampling 806 used in FIG. 8 that sampled the center of the low resolution pixel 804 for each frame, the temporal supersampling 906 illustrated in FIG. 9 is shown to sample at a different location for each frame in a period of 4 frames of the plurality of frames 900.

For example, the temporal supersampling 906 may instruct that sampled low resolution pixel 916a have a sampling location that is toward the upper left corner of the low resolution pixel 904 for frame N-7. For the next frame, N-6, temporal supersampling 906 may define a sample location that is in the upper-right quadrant of sampled low resolution pixel 918a. For the next frames, N-5 and N-4, the sampling location is shown to be in the bottom left quadrant of the sampled low resolution pixel 920a and in the bottom right quadrant of the sampled low resolution pixel 922a, respectively. The illustrated pattern of sampling locations is shown to repeat for sampled low resolution pixels 924a-930a over the next 4 frames, N-3 to N.

It should be noted that, according to the embodiment shown, the temporal supersampling 906 for each of the sampled low resolution pixels 916a-930a results in just 1 stored color value 908 for each frame of the plurality of frames 900. This is in contrast with the number of stored color values 708 (e.g., 4) shown in FIG. 7 that uses high resolution pixels 704 for sampling.

Also shown in FIG. 9 are the sampled color and position 910 for frames N-7 to N that result from temporal supersampling 906. Each of the sampled color and position data 916b-930b conceptually represents what is stored by an associated graphics pipeline into memory, including a color value (e.g., black or white), and a corresponding position (e.g., screen coordinates). Thus, for example, sampled color and position data 930b may include a color value corresponding to white and screen coordinate data corresponding to the bottom-right pixel of a group of four higher resolution pixels (e.g., native pixels) that the low resolution pixel 904 maps to. Additionally, the sampled color and position data 928b includes a color value corresponding to black and a screen coordinate data corresponding to the bottom-left pixel of the group of high resolution pixels that the low resolution pixel 904 maps to. In similar fashion, sampled color and position data 926b and 924b may include color values corresponding to black and white, respectively, as well as screen coordinate data corresponding to the upper right pixel and the upper left pixel of the group of high resolution pixels that low resolution pixel 904 maps to on the screen or display, respectively.

According to the embodiment shown, the color output/rendered image 914 is caused by a reprojection 912 of the sampled color and position 910 over a window of 4 frames. For example, there is a rendered image 932 for frame N that includes a set of 4 high resolution pixels that is 'built' from the sampled color and position data 930b, 928b, 926b, and 924b of frames N, N-1, N-2, and N-3, respectively. In particular, the associated graphics pipeline is enabled to build a high resolution rendered image 932 by mapping the color value stored in sampled color and position data 930b to the bottom right pixel in rendered image 932. Likewise, the color values stored in sampled color and position data 928b, 926b, and 924b are mapped to the bottom left pixel, the top right pixel, and the top left pixel, respectively. As a result, a high resolution rendered image 932 is achieved resembling the color output/rendered image 712 of FIG. 7 (using high resolution pixels for sampling) without needing to store four color values for each frame as may be the case for the rendering process shown in FIG. 7.

A similar reprojection 912 is shown to cause each of rendered images 934-940. For example, rendered image 940 for frame N-4 is shown to be built or reprojected from sampled color and position data 916b-922b. Although each of the rendered images 932-940 of FIG. 9 is shown to be based upon 4 frames for illustrative purposes, it should be noted that the use of temporal supersampling for rendering a given object may extend to any number of previous frames. Moreover, although each of the rendered images 932-940 of FIG. 9 is based on a current frame and 3 prior frames, this need not be the case. For example, in certain other embodiments, rendered image 932 may be built or reprojected based on sampled color and position data 928b, 926b, 924b, and 922b for frames N-1, N-2, N-3, and N-4, respectively. As a result, the illustrated dependencies of rendered images 932-940 are meant to be exemplary and not limiting.

According to some embodiments, the sampling locations shown in the temporal supersampling 906 may be determined by reprojection 912. That is, a sampling location for a prior frame (e.g., frame N-1) may be determined from a current frame's screen coordinate (e.g., bottom right pixel for frame N). As shown in FIG. 9, reprojecting from the current frame's screen coordinate may determine that the sampling location shown in sampled low resolution pixel 928a, which happens to be in the bottom left quadrant of the low resolution pixel 904 and map to the bottom left high resolution pixel for the color output/rendered image 914. It should be noted that while a regular sampling grid pattern is shown in FIG. 9 for the sake of clarity, the particulars of the sampling pattern such as location and unique locations per period of frames may differ for different embodiments.

It should be noted that, compared to the rendering shown in FIG. 8, which requires a similar memory usage (e.g., 1 stored color value per frame per low resolution pixel), the rendering shown in FIG. 9 using temporal supersampling 906 and pixel reprojection 912 enables a color output/rendered image 914 having a higher resolution. This is apparent by comparing color output/rendered image 914 that results from a rendering process with temporal supersampling 906 and the color output/rendered image 944 that results from one without.

As a result, embodiments described here achieve a technical benefit of improving functionality of a VR system by increasing resolution without increasing memory usage (e.g., number of stored color values per pixel per frame). The increase in resolution also reduces aliasing associated with low-resolution regions of a foveated rendering system, which may increase an overall quality of experience for a viewer. For example, if the rendering process shown in FIG. 9 is performed for an entire region composed of a plurality of low resolution pixels 904, the improvement with respect to overall resolution, picture quality, level of detail, sharpness, and anti-aliasing may be even more prominent than what is shown in FIG. 9.

Figure 10:
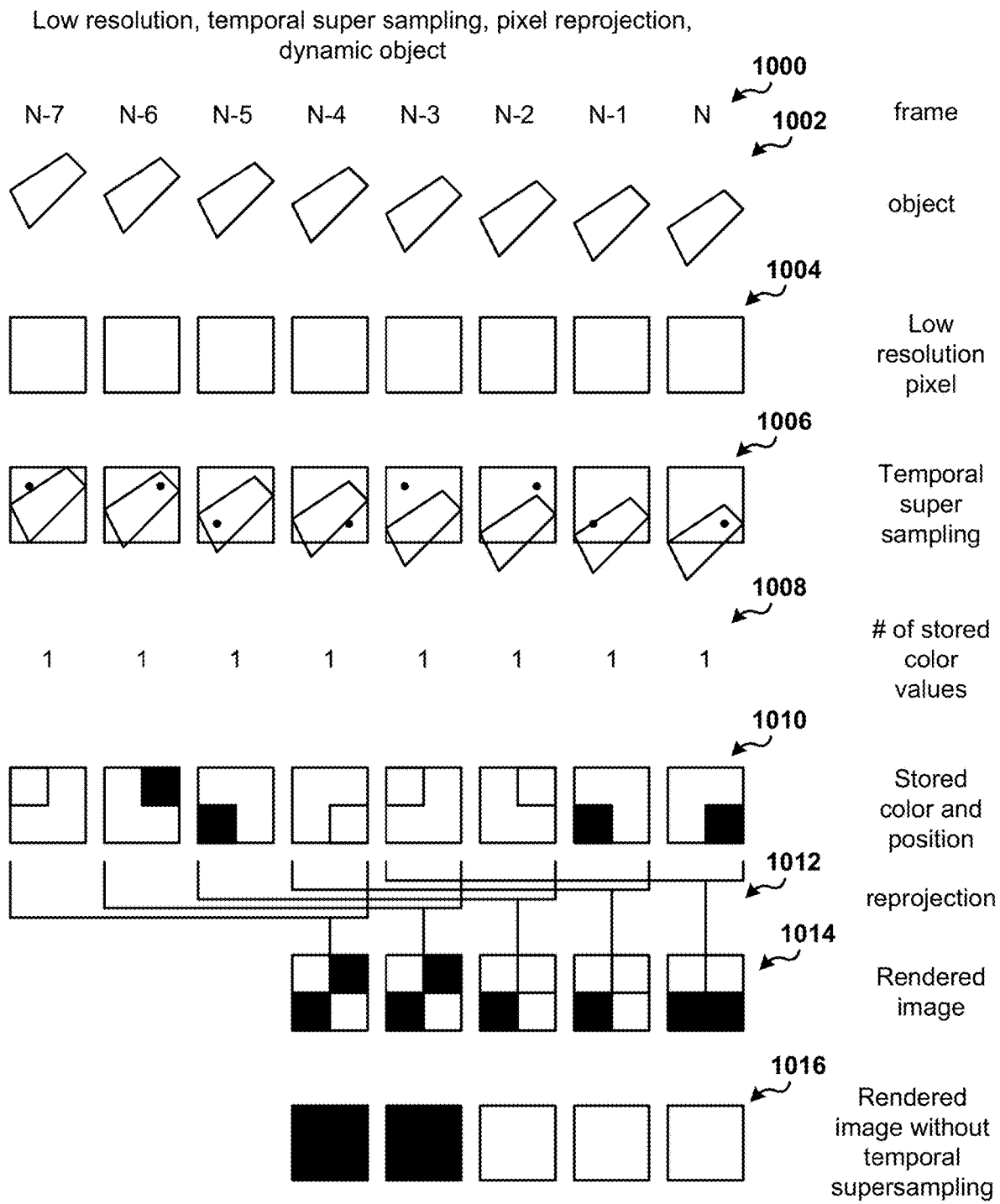
FIG. 10 shows a conceptual scheme of outputting high resolution pixels for a dynamic object using a low resolution sampling region through temporal supersampling, according to one embodiment.

FIG. 10 shows a conceptual scheme of a rendering process using temporal supersampling 1006 for enabling output of higher resolution pixels for rendered images 1014 from a low resolution pixel 1004 used for sampling a dynamic object 1002 over a plurality of frames 1000, according to one embodiment. Similar to the rendering process of FIG. 9, the low resolution pixel 1004 is sampled at different location for every window of 4 frames. According to some embodiments, the sampling locations shown in temporal supersampling 1006 may be determined by reprojection 1012, which may calculate a jitter used to sample previous frames. Additionally, similar to that of FIG. 9, the rendering process shown in FIG. 10 stores just one color value for the low resolution pixel 1006 in the stored color and position 1010 per frame.

The resulting rendered image 1014 is shown to be an improvement over rendered image 1016 that is performed without temporal supersampling with respect to resolution, level of detail, and aliasing.

Figure 11:
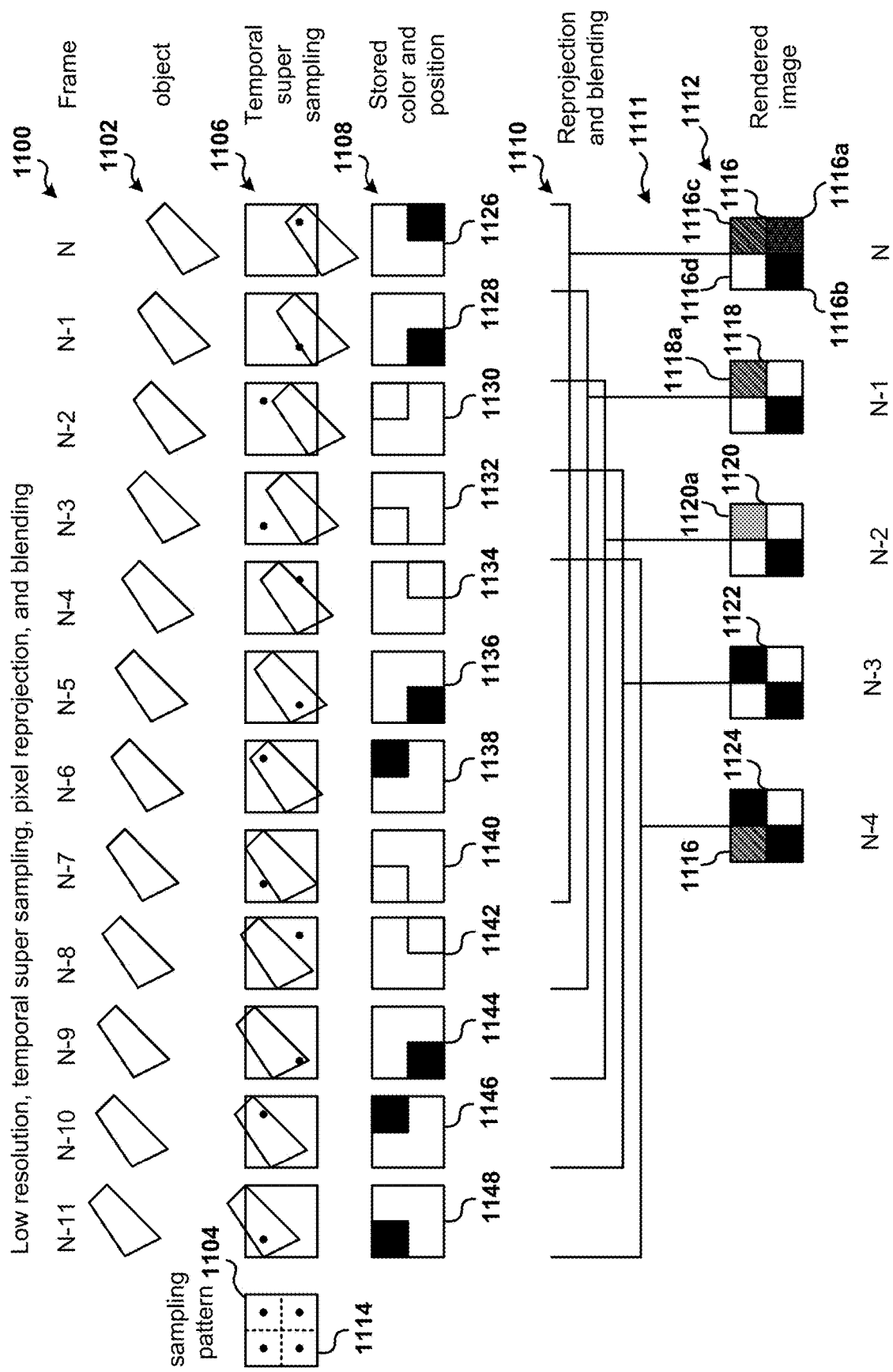
FIG. 11 illustrates a conceptual model for generating higher resolution pixels from a low resolution pixel used for sampling by utilizing temporal supersampling with a regular sampling pattern.

FIG. 11 illustrates a conceptual model for generating higher resolution pixels associated with rendered images 1112 from a low resolution pixel 1104 used for sampling by utilizing temporal supersampling 1106 with reprojection 1110 and blending 1111, according to one embodiment. An object 1102 is shown to move in y over a period of 12 frames (e.g., frames N-11, N-10, . . . , N). The object 1102 is temporally supersampled 1106 at one location within the low resolution pixel 1104 per frame corresponding to the sampling pattern 1114. As previously mentioned, it is contemplated that the sampling locations shown in temporal supersampling 1106 may be determined or defined by reprojection 1110.

According to the embodiment shown, temporal supersampling 1106 results in a single color value per frame that is represented conceptually and visually by stored color and position 1108. According to some embodiments, although temporal supersampling 1106 may result in the color value that is stored, the location component shown in each of the stored color position 1108 may be provided by reprojection 1110. For example, since the reprojection 1110 may provide the next sampling location for a previous frame, reprojection 1110 will also have information on the screen coordinates corresponding that next sampling location. For example, reprojection 1110 may determine from stored color and position data 1126 of frame N that a next sampling location is to move −0.5 pixels in x in order to sample the bottom-left quadrant for the previous frame N-1. As a result, the reprojection 1110 would have information with respect to the screen coordinates of the next sampling location for the frame N-1.

According to the embodiment shown, each of the rendered images 1116-1124 is shown to be the result of reprojection 1110 and blending 1111 based on a respective current frame and 7 previous frames. For certain embodiments, blending 1111 is performed by a pixel shader of the associated graphics pipeline. For example, rendered image 1116 is shown to be based upon color values 1126-1140 for frames N to N-7. However, since there are 8 color values 1126-1140 that map to 4 high resolution pixels 1116a-1116d for the rendered image 1116, there is a redundancy in stored color values with respect to the high resolution pixels they map to. For example, both color value 1130 (white) and color value 1138 (black) map to high resolution pixel 1116c. According to certain embodiments, blending 1111 may compute a final color for high resolution pixel 1116c that is based on the two color values 1130 and 1138. According to the embodiment shown, the final color of high resolution pixel 1116c is a shade of grey that represents an in-between color or blend of color value 1130 and 1138.

In certain embodiments, an average of the color values 1130 and 1138 may be calculated by the pixel shader during blending 1111 and used as the final color value for the high resolution pixel 1116c. In other embodiments, different color values may contribute differently to a final color value that is calculated. For example, according to certain embodiments, an exponential function may be used to describe a given pixel value's contribution to a final color value with respect to time or frame number. For example, color values associated with more recent frames are given a (exponentially) larger weight than color values associated with less recent frames. Thus, according to the embodiment shown in FIG. 11, high resolution pixel 1116c may have a final color value that is closer to color value 1130 than it is to color value 1138 because color value 1130 is associated with a more recent frame (e.g., frame N-2) whereas color value is associated with a frame that is 4 frames prior (e.g., frame N-6).

According to the embodiment shown, high resolution pixel 1116a has a final color value that is mapped from color values 1126 and 1134. However, because color value 1126 is associated with the most recent frame (e.g., frame N), color value 1126 is associated with a greater weight than is color value 1134. As a result, the final color of high resolution pixel 1116a is closer in color to color value 1126 than it is to color value 1134. Also shown in FIG. 11 are high resolution pixels 1116b and 1116d that are mapped from color values 1128 and 1136, and color values 1132 and 1140, respectively. According to the embodiment shown, no blending is necessary to compute the final color values for either of the high resolution pixels 1116b and 1116d because there is no change between the color values 1128 and 1136 or color values 1132 and 1140, respectively.

Also shown in FIG. 11 are rendered images 1118, 1120, 1122, and 1124, each of which is built from color values from 8 frames. It should be noted that there is a high resolution pixel 1118a of rendered image 1118 at frame N-1 that has the same screen coordinates as high resolution pixel 1116c of rendered image 1116 at N-1. High resolution pixels 1118a and 1116c are both shown to be built from color values 1130 and 1138, but are shown to be shaded differently. For example, high resolution pixel 1118a is shown to be shaded with a lighter shade of grey whereas high resolution pixel 1116c is shown to be shaded with a darker shade of grey. According to certain embodiments, high resolution pixel 1118a may be associated with a final color value that is a lighter shade of grey because the color value 1130 (e.g., white) is associated with a more recent frame with respect to rendered image 1118 (1 frame prior to the current frame) than it is with respect to rendered image 1116 (2 frames prior to the current frame). As a result, the color value 1130 may contribute more to the final color of high resolution pixel 1118a due to its relative recentness than it would to final color of high resolution pixel 1116c.

According to the embodiment shown, rendered image 1120 also has a high resolution pixel 1120a that shares screen coordinates with high resolution pixels 1118a and 1116c. Additionally, high resolution pixel 1120a is shown to be built from the same color values 1130 and 1138 as are both of high resolution pixels 1118a and 1116c. However, since color value 1130 is shown to be associated with the most current frame relative to rendered image 1120, color value 1130 may be associated with a greater weight with respect to high resolution pixel 1120a for shading that it would for either of high resolution pixels 1118 or 1116, according to some embodiments.

Figure 12:
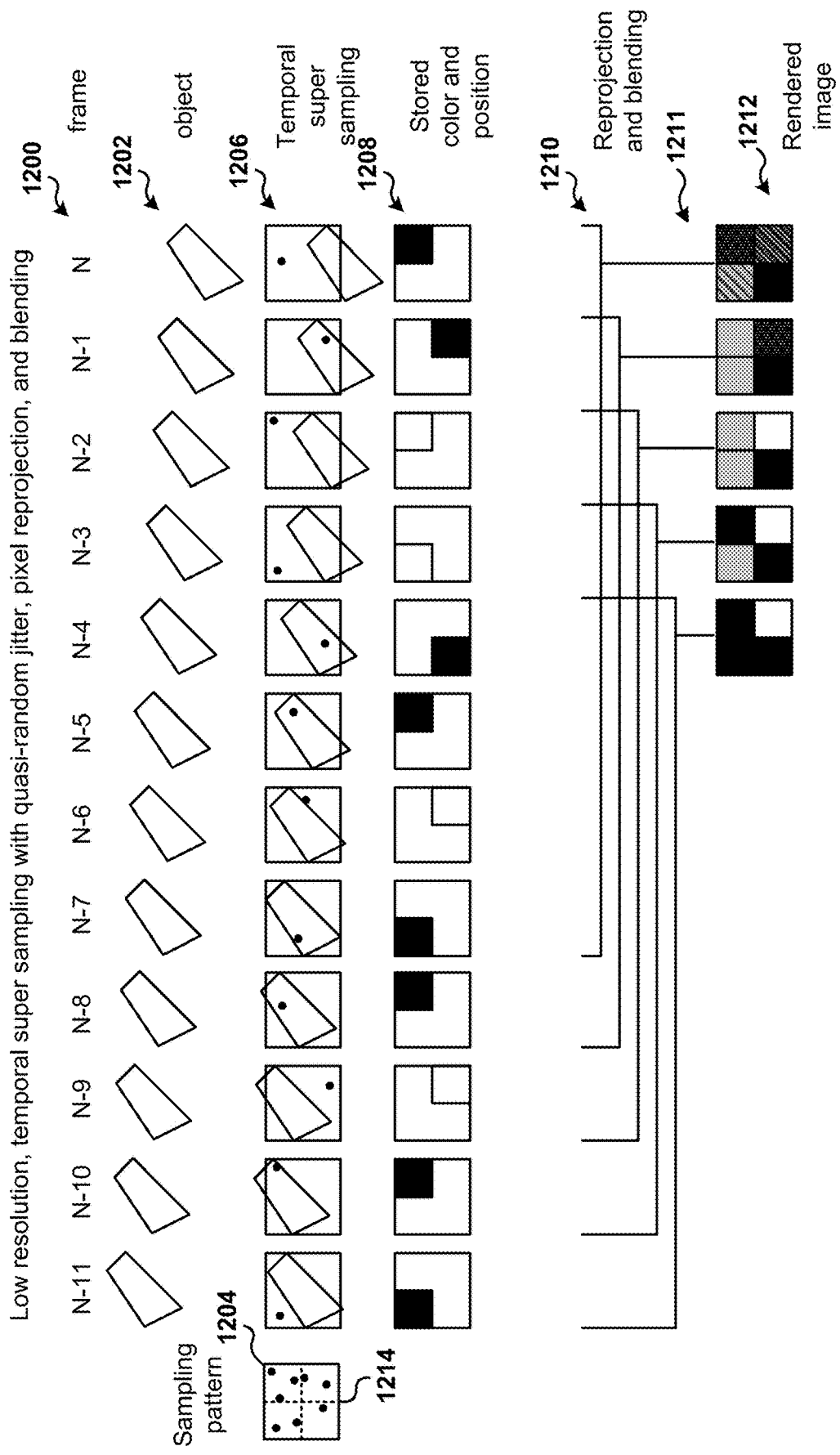
FIG. 12 illustrates a conceptual model for generating higher resolution pixels from a low resolution pixel used for sampling by utilizing temporal supersampling with a quasi-random sampling pattern.

FIG. 12 illustrates a conceptual model for generating higher resolution pixels associated with rendered images 1212 from a low resolution pixel 1204 used during temporal supersampling 1206 having a quasi-random jittered sampling pattern 1214. In the embodiment shown, the dynamic object 1202 is sampled within a low resolution pixel 1204 at a different location every frame, according to the sampling pattern 1214. The sampling pattern 1214 is shown to include 8 sampling locations that repeat every 8 frames, although this need not be the case for other embodiments. For example, in other embodiments, sampling locations need not repeat or cycle.

Moreover, the sampling locations are shown to not be evenly distributed among the 4 quadrants of the low resolution pixel 1204. For example, the top-right sub-pixel is shown to be sampled at 3 locations for a window of 8 frames while the bottom-left sub-pixel is shown to be sampled at just 1 location. There are a number algorithms for sampling within the low resolution pixel 1204, some of which can minimize the occurrence of congregation or uneven distribution of sampling locations. As a result, the sampling patterns and/or algorithms shown here are meant to be illustrative and not limiting, as there are any number of supersampling patterns that may be used in conjunction with the embodiments described here without departing from spirit or scope of the embodiments. Moreover, although the temporal supersampling embodiments for building a high resolution rendered image are shown to be based on a current frame and 7 prior frames, there are any number of frames that a high resolution rendered image can be built from using temporal supersampling and reprojection, depending on the various embodiments. Moreover, although rendered images are shown to be built from pixel values associated with a current frame, other embodiments may be such that a most current rendered image need not necessarily be mapped from pixel values associated with the most current frame.

Figures 13A, 13B:
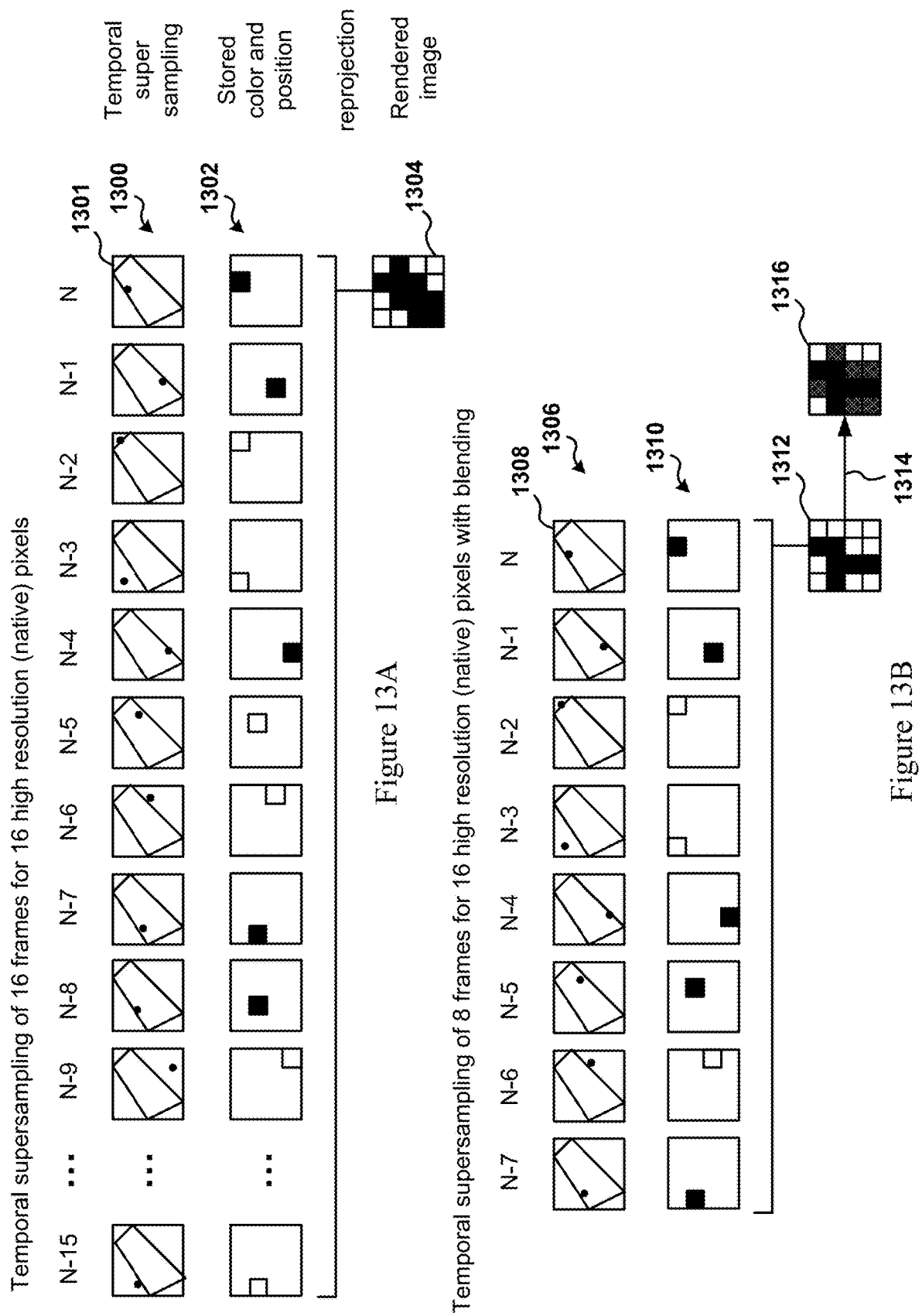
FIG. 13A illustrates an embodiment of reconstituting a set of 16 high resolution pixels from a low resolution sampling area used during temporal supersampling over 16 frames.
FIG. 13B illustrates an embodiment of reconstituting a set of 16 high resolution pixels from a low resolution sampling region used during temporal supersampling over a number of frames that is fewer than the number of high resolution pixels.

FIG. 13A illustrates an embodiment of reconstituting a set of 16 high resolution pixels 1304 from a low resolution sampling area 1301 used during temporal supersampling 1300 over 16 frames. According to the embodiment shown, the low resolution sampling area 1301 maps to a set of 16 high resolution pixels 1304. The embodiment is enabled to obtain a color value for each of the high resolution pixels 1304 via the temporally supersampling 1300 of 16 sub-pixel regions that correspond to each of the 16 high resolution pixels 1304. For example, a different sub-pixel region may be sampled for each of the 16 frames shown, resulting in just one color value stored per frame as shown in stored color and position 1302. As mentioned earlier, a sampling pattern used for the temporal supersampling 1300 may involve jitter and may be determined by reprojection (which was described in more detail above). As a result, the advantages and implementations discussed here are not limited to reconstituting 4 pixels, but can be extended to reconstituting any number of higher resolution pixels from a lower resolution sampling region.

FIG. 13B illustrates an embodiment of reconstituting a set of 16 high resolution pixels 1316 from a low resolution sampling region 1308 used during temporal supersampling 1306 over a number of frames that is fewer than the number of high resolution pixels 1316. For example, temporal supersampling 1306 is shown to occur only over 8 frames, resulting in the same number of color values 1310. During reconstitution, an associated pixel shader or compute shader attempts to "fill in" (e.g., draw, shade, color) the high resolution pixel grid 1312 with the color values 1310 and their associated position. For example, 8 of the 16 pixels of the high resolution pixel grid 1312 are associated with a stored pixel value. The remaining unshaded pixels may then undergo blending 1314 using a nearest neighbor approach, historical color data, a combination of both, or otherwise, to provide the rendered image comprising of the 16 high resolution pixels 1316. As a result, the principles and advantages of the embodiments described here can be implemented for a particular number of high resolution pixels even if a process of temporal supersampling involves sampling a fewer number of frames than the number of high resolutions pixels. For example, embodiments contemplated here may apply temporal supersampling.

It is noted that where a pixel shader is referred to, a compute shader is also meant to be referred to for some embodiments. Further, although an exemplary sampling patterns are shown in FIGS. 13A and 13B, for example, it is noted that any number of sampling patterns may be implemented with the embodiments described here.

Figure 14:
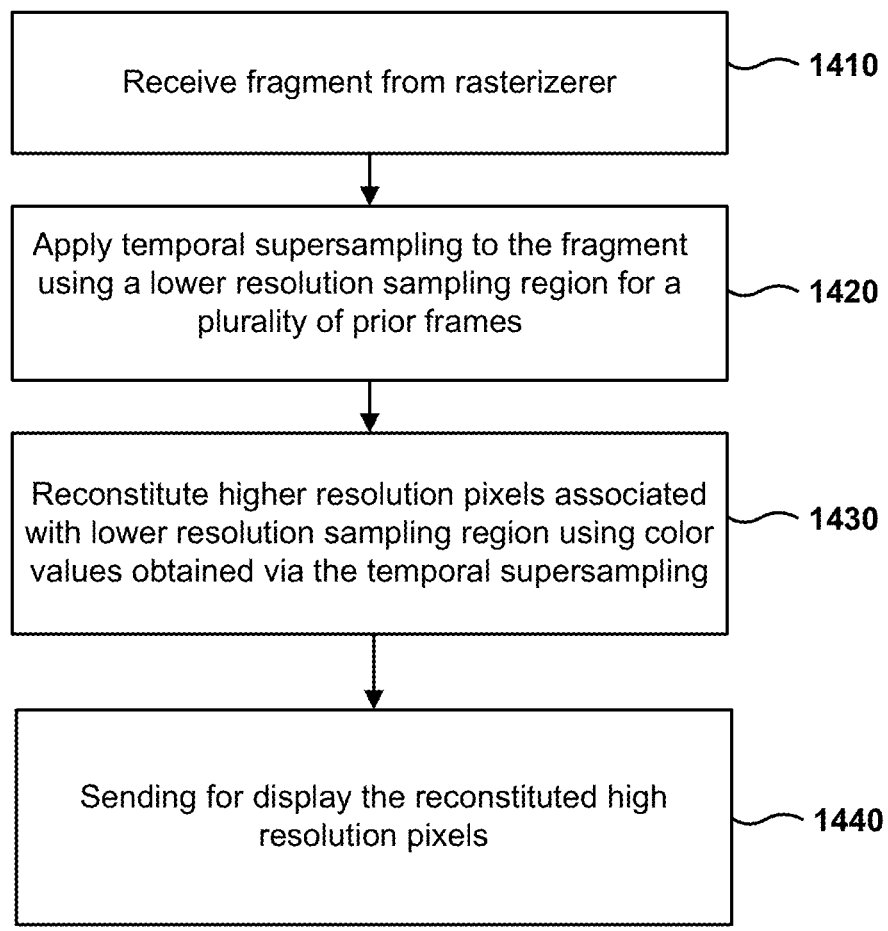
FIG. 14 illustrates an overall flow of a method that enables reconstitution of higher resolution pixels from a low resolution sampling region using color values obtained through temporal supersampling over a plurality of prior frames.

FIG. 14 illustrates an overall flow of a method that enables reconstitution of higher resolution pixels from a low resolution sampling region using color values obtained through temporal supersampling over a plurality of prior frames. The embodied method includes an operation 1410 for receiving a fragment from a rasterizer of an associated graphics pipeline and an operation 1420 for applying temporal supersampling to the fragment using a lower resolution sampling region over a plurality of prior frames that are stored in a buffer such as a frame buffer. As discussed above, the temporal supersampling may sample different locations within a lower resolution sampling region based on pixel reprojection and/or jitter. Moreover, as described above, the number of prior frames that are sampled may vary in number depending on the various embodiments.

The method shown in FIG. 14 then flows to operation 1430, which serves to reconstitute higher resolution pixels associated with the lower resolution sampling region using the color values obtained via the temporal supersampling. According to certain embodiments, the reconstitution may occur in a final buffer such as a display buffer, which may store the color values obtained via the temporal supersampling in a way that is addressable by actual pixel locations (e.g., physical pixels). The method of FIG. 14 then flows to operation 1440, which serves to send the reconstituted high resolution pixels for display (e.g., on a head mounted display).

Figure 15:
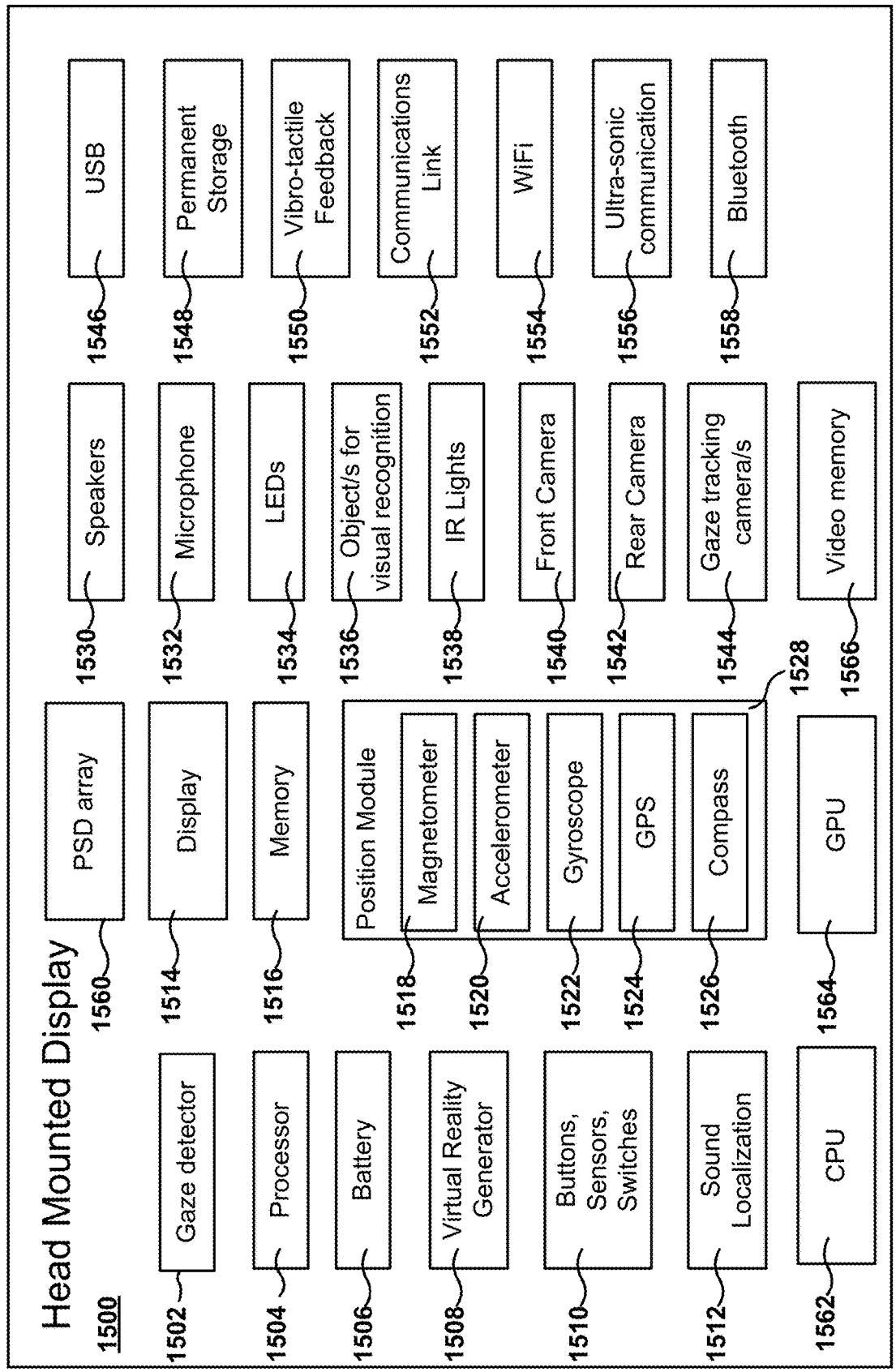
FIG. 15 illustrates an additional embodiment of a head mounted display (HMD) that may be used with the presented method and/or system.

FIG. 15 illustrates an additional embodiment of an HMD 1500 that may be used with the presented method and/or system. HMD 1500 includes hardware such as a gaze detector 1502, a processor 1504, battery 1506, virtual reality generator 1508, buttons, sensors, switches 1510, sound localization 1512, display 1514, and memory 1516. HMD 1500 is also shown to include a position module 1528 that comprises a magnetometer 1518, an accelerometer 1520, a gyroscope 1522, a GPS 1524, and a compass 1526. Further included on HMD 1500 are speakers 1530, microphone 1532, LEDs 1534, object/s for visual recognition 1536, IR lights 1538, front camera 1540, rear camera 1542, gaze tracking camera/s 1544, USB 1546, permanent storage 1548, vibro-tactile feedback 1550, communications link 1552, Wi-Fi 1554, ultra-sonic communication 1556, Bluetooth 1558, and photo-sensitive diodes (PSD) array 1560. In some embodiments, the HMD 1500 may also include one or more CPUs 1562, one or more GPUs 1564, and a video memory 1566.

Figure 16:
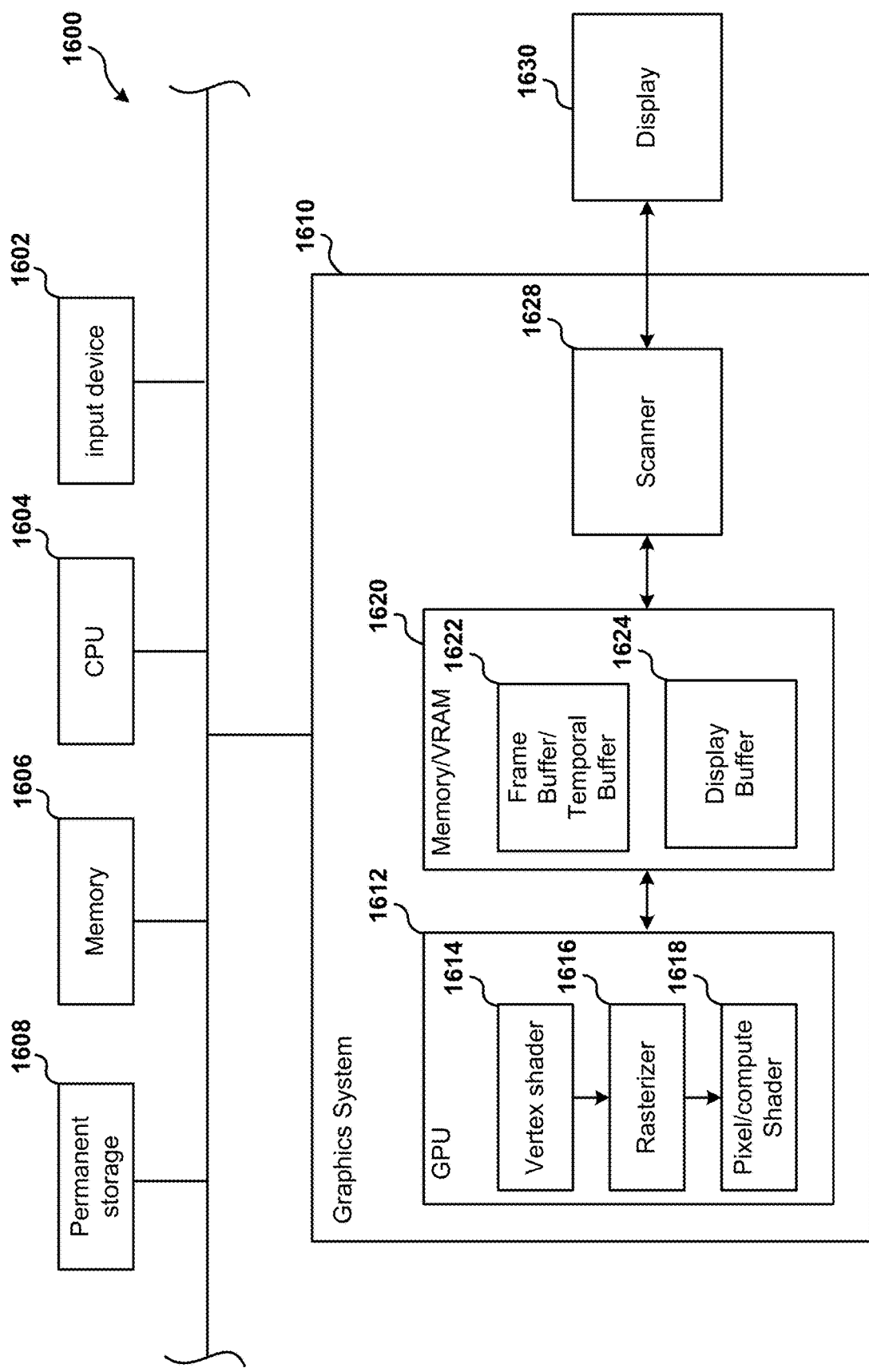
FIG. 16 is a diagram of a computing system 1600 that may be used to implement the various embodiments described here.

FIG. 16 is a diagram of a computing system 1600 that may be used to implement the various embodiments described here. The computing system 1600 includes an input device 1602 for receiving user input. The input device 1602 can be any user controlled device or user-responsive device, such as a mouse, a touch screen, a joy stick, a remote control, a pointing device, a wearable object, or a head mounted display. The computing system 1600 is also shown to include a CPU 1604, which is responsible for executing application programs that generate vertex and geometry data for the graphics system 1610 to process and render. The CPU 1604 is also responsible for processing input received via the input device 1602 with respect to the application programs. Further, the computing system is shown to include a memory 1606 and permanent storage 1608.

The graphics system 1610 of the exemplary computing system 1600 is shown to include a GPU 1612 in communication with a memory/VRAM 1620, which is in communication with a scanner 1628. GPU 1612 is shown to include a vertex shader 1614 that receives vertex and geometry data associated with the executed application performs operations related to geometrical transformations and manipulations on the received vertex and geometry data. In some embodiments, the output of the vertex shader 1614 is sent and stored in the frame buffer/temporal buffer 1622.

According to some embodiments, GPU 1612 is also shown to implement a rasterizer 1616, which converts the outputted vertex and geometrical data from the vertex shader 1614 into pixel data (e.g., fragment data). According to some embodiments, the rasterizer 1616 is able to perform certain sampling functions described here.

The GPU 1612 is also shown to carry out a pixel shader 1618 (also known as a fragment shader), which serves to obtain color values for pixels that are to be displayed. According to some embodiments, the temporal supersampling described here may be performed with the help of the pixel shader, for example, by accessing the frame buffer/temporal buffer 1622. Moreover, according to certain embodiments, the pixel shader 1618 may output pixel data that is to be stored in the display buffer 1624. In one embodiment, the scanner 1628 is enabled to read the pixel data stored on the display buffer and send it for display on the display 1630. Again, pixel shader refers to either a pixel shader or a compute shader here.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
   generating a plurality of frames in a graphics pipeline when executing an application;
   rendering an object for a low resolution pixel for the plurality of frames by sampling the low resolution pixel at a plurality of unique sampling locations over the plurality of frames, wherein the low resolution pixel includes a subset of pixels taken from a plurality of native pixels of a display;
   storing in a temporal buffer a plurality of sampled color values and a plurality of locations on the display corresponding to the plurality of unique sampling locations for the plurality of frames, wherein the plurality of sampled color values and the plurality of locations are determined during rendering of the low resolution pixel; and
   reprojecting the plurality of sampled color values to the subset of pixels at high resolution for a current frame.

2. The method of claim 1, further comprising:
   rendering at the high resolution the plurality of native pixels in a foveal region for the plurality of frames,
   wherein attention of a user is directed to the foveal region,
   wherein the low resolution pixel is located in a peripheral region located outside of the foveal region.

3. The method of claim 1, wherein the reprojecting the plurality of sampled color values includes:
   mapping a corresponding sampled color value from the plurality of sampled color values to each of the subset of pixels.

4. The method of claim 1,
   wherein a color value and a sampling location pair of a corresponding unique sampling location is stored for the low resolution pixel for each of the plurality of frames.

5. The method of claim 1,
   wherein the subset of pixels of the low resolution pixel includes N native pixels,
   wherein the low resolution pixel is sampled at N unique sampling locations.

6. The method of claim 1,
   wherein the subset of pixels of the low resolution pixel includes N native pixels,
   wherein the low resolution pixel is sampled at less than N unique sampling locations.

7. The method of claim 1, further comprising:
   using a sampling pattern to sample the low resolution pixel at the plurality of unique sampling locations.

8. The method of claim 1, further comprising:
   wherein the rendering of the low resolution pixel includes the sampling the low resolution pixel at the plurality of unique sampling locations that is greater than N over the plurality of frames that is greater than N, wherein the subset of pixels of the low resolution pixel includes N native pixels; and
   blending at least two sampled color values from the plurality of sampled color values for a corresponding native pixel.

9. The method of claim 8, wherein the blending of the at least two sampled color values includes:
   weighting a more recent sampled color value from the at least two sampled color values higher than a less recent sampled color value.

10. The method of claim 1,
wherein the plurality of frames includes the current frame and previous frames.

11. The method of claim 1,
wherein the plurality of frames includes only previous frames.

12. The method of claim 1,
wherein the plurality of unique sampling locations is evenly distributed across the low resolution pixel.

13. The method of claim 1, further comprising:
wherein the rendering of the low resolution pixel includes the sampling the low resolution pixel at the plurality of unique sampling locations that is less than N over the plurality of frames that is less than N, wherein the subset of pixels of the low resolution pixel includes N native pixels; and
sampling the low resolution pixel at the plurality of unique sampling locations that correspond to a subset of N native pixels; and
filling in an unshaded pixel by blending color values from at least two nearest neighbors or by blending color values taken from historical color data for a combination including at least two of the unshaded pixel or the at least two nearest neighbors.

14. A non-transitory computer-readable medium for performing a method, the computer-readable medium comprising:
program instructions for generating a plurality of frames in a graphics pipeline when executing an application;
program instructions for rendering an object for a low resolution pixel for the plurality of frames by sampling the low resolution pixel at a plurality of unique sampling locations over the plurality of frames, wherein the low resolution pixel includes a subset of pixels taken from a plurality of native pixels of a display;
program instructions for storing in a temporal buffer a plurality of sampled color values and a plurality of locations on the display corresponding to the plurality of unique sampling locations for the plurality of frames, wherein the plurality of sampled color values and the plurality of locations are determined during rendering of the low resolution pixel; and
program instructions for reprojecting the plurality of sampled color values to the subset of pixels at high resolution for a current frame.

15. The non-transitory computer-readable medium of claim 14, further comprising:
program instructions for rendering at the high resolution the plurality of native pixels in a foveal region for the plurality of frames, wherein attention of a user is directed to the foveal region, wherein the low resolution pixel is located in a peripheral region located outside of the foveal region; and
wherein the program instructions for reprojecting the plurality of sampled color values includes program instructions for mapping a corresponding sampled color value from the plurality of sampled color values to each of the subset of pixels.

16. The non-transitory computer-readable medium of claim 14,
wherein in the method the subset of pixels of the low resolution pixel includes N native pixels,
wherein in the method the low resolution pixel is sampled at N unique sampling locations.

17. The non-transitory computer-readable medium of claim 14, further comprising:
wherein the program instructions for rendering of the low resolution pixel includes the program instructions for sampling the low resolution pixel at the plurality of unique sampling locations that is greater than N over the plurality of frames that is greater than N, wherein the subset of pixels of the low resolution pixel includes N native pixels; and
program instructions for blending at least two sampled color values from the plurality of sampled color values for a corresponding native pixel.

18. A computer system comprising:
a processor;
memory coupled to the processor and having stored therein instructions that, if executed by the computer system, cause the computer system to execute a method for graphics processing, comprising:
generating a plurality of frames in a graphics pipeline when executing an application;
rendering an object for a low resolution pixel for the plurality of frames by sampling the low resolution pixel at a plurality of unique sampling locations over the plurality of frames, wherein the low resolution pixel includes a subset of pixels taken from a plurality of native pixels of a display;
storing in a temporal buffer a plurality of sampled color values and a plurality of locations on the display corresponding to the plurality of unique sampling locations for the plurality of frames, wherein the plurality of sampled color values and the plurality of locations are determined during rendering of the low resolution pixel; and
reprojecting the plurality of sampled color values to the subset of pixels at high resolution for a current frame.

19. The computer system of claim 18, the method further comprising:
rendering at the high resolution the plurality of native pixels in a foveal region for the plurality of frames, wherein attention of a user is directed to the foveal region, wherein the low resolution pixel is located in a peripheral region located outside of the foveal region; and
wherein the reprojecting the plurality of sampled color values includes mapping a corresponding sampled color value from the plurality of sampled color values to each of the subset of pixels.

20. The computer system of claim 18, the method further comprising:
wherein the rendering of the low resolution pixel includes the sampling the low resolution pixel at the plurality of unique sampling locations that is greater than N over the plurality of frames that is greater than N, wherein the subset of pixels of the low resolution pixel includes N native pixels; and
blending at least two sampled color values from the plurality of sampled color values for a corresponding native pixel.

* * * * *